United States Patent

Romesburg et al.

Patent Number: 6,163,608
Date of Patent: Dec. 19, 2000

[54] METHODS AND APPARATUS FOR PROVIDING COMFORT NOISE IN COMMUNICATIONS SYSTEMS

[75] Inventors: Eric Douglas Romesburg, Chapel Hill; Leland Scott Bloebaum; Corattur Natesan Sambandam Guruparan, both of Cary, all of N.C.

[73] Assignee: Ericsson Inc., Research Triangle Park, N.C.

[21] Appl. No.: 09/005,145

[22] Filed: Jan. 9, 1998

[51] Int. Cl.[7] .............................. H04M 9/08; H04M 9/00; H04M 1/24
[52] U.S. Cl. ............................................. 379/410; 379/407
[58] Field of Search ...................... 379/390, 392, 379/406, 407, 409, 410; 455/570; 381/71.1, 94.1, 94.7, 95.96

[56] References Cited

U.S. PATENT DOCUMENTS

| | | |
|---|---|---|
| 5,283,784 | 2/1994 | Genter . |
| 5,475,731 | 12/1995 | Rasmusson . |
| 5,630,016 | 5/1997 | Swaminathan et al. . |

FOREIGN PATENT DOCUMENTS

| | | |
|---|---|---|
| 0 704 988 | 4/1996 | European Pat. Off. . |
| 2 256 351 | 12/1992 | United Kingdom . |
| WO96/22651 | 7/1996 | WIPO . |
| 96 42142 | 12/1996 | WIPO . |
| 97 49196 | 12/1997 | WIPO . |

*Primary Examiner*—Wing F. Chan
*Attorney, Agent, or Firm*—Burns, Doane, Swecker & Mathis, L.L.P.

[57] ABSTRACT

Methods and apparatus for parametrically modeling background noise and generating comfort noise in echo suppression systems are disclosed. According to exemplary embodiments, a background noise model is based on a set of noise model parameters which are in turn based on measurements of actual background noise in an echo suppression system. The exemplary embodiments include autoregressive, autoregressive moving-average and frequency-domain models. An exemplary first-order autoregressive moving-average model includes a single fixed zero and a single variable pole. The single zero and the single pole are sufficient to provide appropriate spectral tilt in the resulting modeled noise, and the single zero ensures that the model is unconditionally stable. Integration of the exemplary parametric noise models with various echo suppression devices is also disclosed.

50 Claims, 5 Drawing Sheets

METHODS AND APPARATUS FOR PROVIDING COMFORT NOISE IN COMMUNICATIONS SYSTEMS

BACKGROUND OF THE INVENTION

The present invention relates to communications systems, and more particularly, to echo suppression in a bidirectional communications link.

In many communications systems, for example landline and wireless telephone systems, voice signals are often transmitted between two system users via a bi-directional communications link. In such systems, speech of a near-end user is typically detected by a near-end microphone at one end of the communications link and then transmitted over the link to a far-end loudspeaker for reproduction and presentation to a far-end user. Conversely, speech of the far-end user is detected by a far-end microphone and then transmitted via the communications link to a near-end loudspeaker for reproduction and presentation to the near-end user. At either end of the communications link, loudspeaker output detected by a proximate microphone may be inadvertently transmitted back over the communications link, resulting in what may be unacceptably disruptive feedback, or echo, from a user perspective.

Therefore, in order to avoid transmission of such undesirable echo signals, the microphone acoustic input should be isolated from loudspeaker output as much as possible. With a conventional telephone handset, in which the handset microphone is situated close to the user's mouth while the handset speaker essentially covers the user's ear, the requisite isolation is easily achieved. However, as the physical size of portable telephones has decreased, and as hands-free speaker-phones have become more popular, manufacturers have moved toward designs in which the acoustic path from the loudspeaker to the microphone is not blocked by the user's head or body. As a result, the need for more sophisticated echo suppression techniques has become paramount in modern systems.

The need is particularly pronounced in the case of hands-free automobile telephones, where the closed vehicular environment can cause multiple reflections of a loudspeaker signal to be coupled back to a high-gain hands-free microphone. Movement of the user in the vehicle and changes in the relative directions and strengths of the echo signals, for example as windows are opened and closed or as the user moves his head while driving, further complicate the task of echo suppression in the automobile environment. Additionally, more recently developed digital telephones process speech signals through voice encoders which introduce significant signal delays and create non-linear signal distortions. Such prolonged delays tend to magnify the problem of signal echo from a user perspective, and the additional non-linear distortions make echo suppression by the network equipment more difficult.

In response to the above described challenges, telephone manufacturers have developed a wide variety of echo suppression mechanisms. An exemplary echo suppression system 100 is depicted in FIG. 1A. As shown, the exemplary system 100 includes a microphone 110, a loudspeaker 120 and an echo suppressor 130. An audio output 115 of the microphone 110 is coupled to an audio input of the echo suppressor 130, and an audio output 135 of the echo suppressor 130 serves as a near-end audio input to a telephone (not shown). Additionally, a far-end audio output 125 from the telephone is coupled to an audio input of the loudspeaker 120 and to a reference input of the echo suppressor 130.

In operation, the echo suppressor 130 processes the microphone signal 115 to provide the audio output signal 135 to a far-end telephone user. More specifically, the echo suppressor 130 attenuates the microphone signal 115, in dependence upon the far-end audio signal 125, so that acoustic echo from the loudspeaker 120 to the microphone 110 is not passed back to the far-end telephone user.

Typically, the echo suppressor 130 is either a non-linear, clipping type suppressor or a linear, scaling type suppressor. Clipping type suppressors generally attenuate the microphone output signal 115 by removing a portion of the signal falling within a particular range of values (i.e., within a particular clipping window). Scaling type suppressors, on the other hand, attenuate the microphone output signal 115 by multiplying the signal with an appropriate scale factor. Recently developed hybrid suppressors incorporate both clipping and scaling aspects, for example by scaling a portion of the microphone signal falling within a particular attenuation window. In any case, the level of attenuation (i.e., the clipping window and/or the scale factor) is generally adjusted, either directly or indirectly, in accordance with the amplitude of the far-end audio signal 125 so that the microphone output 115 is attenuated only to the extent the far-end user is speaking.

A conventional clipping type suppressor, known in the art as a center clipper, is described for example in U.S. Pat. No. 5,475,731, entitled "Echo-Canceling System and Method Using Echo Estimate to Modify Error Signal" and issued Dec. 12, 1995 to Rasmusson et al. An alternative clipping type suppressor, known as an AC-Center clipper, is described in copending U.S. patent application Ser. No. 08/775,797, entitled "An AC-Center Clipper for Noise and Echo Suppression in a Communications System" and filed Dec. 31, 1996. An exemplary scaling type suppressor is described in U.S. Pat. No. 5,283,784, entitled "Echo Canceller Processing Techniques and Processing" and issued Feb. 1, 1994 to Genter. An advanced hybrid suppressor, referred to herein as an AC-center attenuator, is described in copending U.S. patent application Ser. No. 09/005,149, entitled "Methods and Apparatus for Improved Echo Suppression in Communications Systems" and filed on even date herewith. Advanced control of these and other clipping, scaling and hybrid type suppressors is described in copending U.S. patent application Ser. No. 09/005,144, entitled "Methods and Apparatus for Controlling Echo Suppression in Communications Systems" and filed on even date herewith. Each of the above identified patents, as well as each of the above identified copending patent applications, is incorporated herein in its entirety by reference.

The echo suppressor 130 of FIG. 1A can also be combined with a linear echo canceler to provide a more sophisticated echo suppression system. FIG. 1B depicts an exemplary system 101 including the microphone 110, the loudspeaker 120 and the echo suppressor 130 of FIG. 1A, and an acoustic echo canceler 140. As shown, the audio output 115 of the microphone 110 is coupled to an audio input of the acoustic echo canceler 140, and control and audio outputs 144, 145 of the acoustic echo canceler 140 are coupled to control and audio inputs of the echo suppressor 130, respectively. The audio output 135 of the echo suppressor 130 serves as the near-end audio input to the telephone (not shown), and the far-end audio output 125 from the telephone is coupled to the audio input of the loudspeaker 120 and to reference inputs of the acoustic echo canceler 140 and the echo suppressor 130.

In operation, the acoustic echo canceler 140 dynamically models the acoustic path from the loudspeaker 120 to the microphone 110 and attempts to cancel, from the microphone output signal 115, any loudspeaker sound that is picked up by the microphone 110. Algorithms commonly used for modeling the acoustic echo path include the well known Least Mean Squares (LMS) algorithm and variants such as Normalized Least Mean Squares (NLMS). An exemplary Least Mean Squares based canceler is described in the above cited U.S. Pat. No. 5,475,731 to Rasmusson et al. Additionally, an advanced Normalized Least Mean Squares based canceler is described in copending U.S. patent application Ser. No. 08/852,729, entitled "An Improved Echo Canceler for use in Communications Systems" and filed May 7, 1997, which is incorporated herein in its entirety by reference.

The control output, or control metric 144 indicates the instantaneous level of cancelation achieved by the acoustic echo canceler 140 and is used by the echo suppressor 130 to determine the level of additional attenuation needed to suppress any residual echo component to a particular goal level. As in the system 100 of FIG. 1A, the echo suppressor 130 can be a clipping suppressor, a scaling suppressor or a hybrid suppressor. The control metric 144 is thus adjusted accordingly as described for example in the above cited patents and patent applications. Additionally, the echo suppressor 130 can, when following the echo canceler 140, be a simple switch which selectively mutes the audio output 135 at appropriate times (e.g., during periods in which a near-end voice activity detector indicates that the microphone signal 115 contains no near-end speech).

Note that in both of the exemplary systems 100, 101 of FIGS. 1A and 1B, the echo suppressor 130 attenuates the entire audio signal. Thus, in addition to attenuating the echo, the echo suppressor 130 also attenuates any background noise and/or near-end speech which may be present. In fact, the background noise can be suppressed to the point that the far-end user may erroneously believe that the call has been disconnected when the echo suppressor 130 is active. Therefore, to improve the quality of communication for the far-end user, today's systems often add comfort noise to the telephone audio signal 135 when the echo suppressor 130 is active.

For example, some systems replace muted audio signals with white noise produced by a pseudo-random number generator (PRNG), wherein a variance of the noise samples is set based on an estimate of the energy in the actual background noise. Additionally, the above cited U.S. Pat. No. 5,283,784 to Genter describes a similar approach in which white noise samples are band-limited to the telephone system bandwidth and stored in a read only memory (ROM) table. Comfort noise is then generated as needed by selecting samples from the table. Yet another solution is described in U.S. patent application Ser. No. 08/375,144, entitled "Method of and Apparatus for Echo Reduction in a Hands-Free Cellular Radio Communication System" and filed Jan. 19, 1995, which is incorporated herein in its entirety by reference. There a block of samples of actual background noise is stored in memory, and comfort noise is generated by outputting segments of successively stored samples beginning with random starting points within the block.

While the above described systems provide certain advantages, none provides comfort noise which closely and consistently matches the actual environment noise in terms of both spectral content and magnitude. For example, the spectral content of comfort noise produced by generating white noise samples is, by definition, uniform across the audible frequency band, while automobile background noise is typically biased toward the low end of the band. Also, since the degree of spectral tilt varies from car to car and depends on prevailing driving conditions, storing an exemplary tilted spectrum in ROM is insufficient. Further, comfort noise generated by repeatedly outputting segments of actual noise samples includes a significant periodic component and therefore often sounds as if it includes a distorted added tone.

Thus, with conventional noise generation techniques, the far-end user perceives continual changes in the character and content of the transmitted background noise, as comfort noise is selectively added or substituted only when the echo suppressor 130 is active. Such changes in the perceived background noise can be annoying or even intolerable. For example, with the relatively long delay in today's digital cellular phones, differences between actual background noise and modeled comfort noise are often perceived as whisper echoes. Consequently, there is a need for improved methods and apparatus for generating comfort noise in echo suppression systems.

SUMMARY OF THE INVENTION

The present invention fulfills the above-described and other needs by providing methods and apparatus for parametrically modeling acoustic background noise in echo suppression systems. By way of contrast to conventional systems in which comfort noise is produced by generating white noise samples or by repeatedly outputting stored noise sample sequences, the present invention teaches that higher quality comfort noise (i.e., comfort noise that more closely matches actual system environment noise) can be produced effectively based on a set of noise model parameters which are in turn based on measurements of actual system noise.

According to the invention, noise model parameters are computed during periods of speech inactivity (i.e., when only noise is present) and frozen during periods of speech activity. Prevailing noise model parameters are then used to generate high quality comfort noise which is substituted for actual noise whenever the actual noise is muted or attenuated by an echo suppressor. Since the comfort noise closely matches the actual background noise in terms of both character and level, far-end users perceive signal continuity and are not distracted by the artifacts introduced by conventional systems.

According to a first exemplary embodiment, a parametric noise model is based on the autocorrelation function of a frame of audio samples output by a microphone. The autocorrelation function is smoothed or averaged over multiple sample frames, and the prevailing, smoothed autocorrelation function is used to compute coefficients for an all-pole spectral shaping filter. The shaping filter is then used to synthesize comfort noise based on an excitation of white noise samples having a variance which is proportional to the first, zero-lag element of the smoothed autocorrelation function.

According to a second exemplary embodiment, a parametric noise model is based on an autocorrelation function and on a set of fixed filter coefficients which are used in combination to create an autoregressive moving-average (ARMA) spectral shaping filter. Specifically, a frame of audio samples output by a microphone is passed through an all-pole filter constructed from the fixed filter coefficients, and the filtered samples are used to compute the autocorrelation function. The autocorrelation function is smoothed over multiple frames, and the prevailing, smoothed autocorrelation function is used to compute coefficients for an all-pole filter. The all-pole filter is cascaded with an all-zero filter derived from the fixed filter coefficients to create the autoregressive moving-average spectral shaping filter. The spectral shaping filter is then used to synthesize comfort noise based on an excitation of white noise samples having a variance proportional to the first, zero-lag element of the autocorrelation function.

According to a third exemplary embodiment, a parametric noise model is based on a vector of discrete spectral magnitudes. The spectral magnitudes are computed based on a frame of audio samples output by a microphone. Specifically, the spectral magnitudes are computed as a discrete Fourier transform of the audio sample frame. Alternatively, when a frequency-domain acoustic echo suppressor is used to process the microphone signal, the spectral magnitudes are taken directly from an audio sample frame output by the acoustic echo suppressor. In either case, the vector of spectral magnitudes is smoothed over multiple frames, and the prevailing, smoothed magnitude vector is used to synthesize comfort noise as necessary. Specifically, an excitation of uniform random phases is applied to the prevailing, smoothed magnitude vector, and the resulting complex spectrum samples are transformed to the time domain using an inverse discrete Fourier transform.

According to a fourth exemplary embodiment, a parametric noise model includes an autoregressive moving-average spectral shaping filter having a single fixed zero and a single variable pole. The variable pole for the spectral shaping filter is computed during periods of speech inactivity using a Normalized Least-Mean Squares algorithm to recursively adjust an adaptive filter corresponding to the inverse of the spectral shaping filter. The prevailing spectral shaping filter is then used to synthesize comfort noise based on an excitation of white noise samples having energy equal to the actual system noise, wherein the white noise samples are generated by randomly selecting single samples from a buffer of actual system noise samples. Advantageously, the single fixed zero and the single variable pole of the spectral shaping filter are sufficient to provide appropriate spectral tilt in the resulting comfort noise, and the single fixed zero ensures that the adaptive inverse filter is unconditionally stable. As a result, the exemplary embodiment is both robust and of low-complexity.

Advantageously, the above described techniques can be utilized in any communications system in which noise modeling is needed or desired. For example, an exemplary echo suppression device according to the invention includes a noise modeling processor and a noise generation processor. The device is configured to attenuate an echo component of a communications signal, and the noise modeling processor is configured to generate one or more noise modeling parameters based on the communications signal. The noise modeling parameters define a parametric model of a noise component of the communications signal, and the noise generation processor is configured to provide modeled noise samples based on the noise modeling parameters. In an exemplary embodiment, the modeled noise samples are added to an output of the echo suppression device to replace the attenuated noise component.

An alternative echo suppression device according to the invention includes an echo suppressor, a sample buffer and a noise generation processor. The echo suppressor is configured to attenuate echo and noise components of a communications signal, and the sample buffer is used to store frames of samples of the communications signal. The noise generation processor is configured to pseudo-randomly select single samples from the buffer in order to provide a sequence of white noise samples having a power level equal to a power level of the frame of samples. In an exemplary embodiment, the sequence of white noise samples is filtered to provide comfort noise which is added to an output of the echo suppressor.

Another alternative echo suppression device according to the invention includes an echo suppressor, a noise modeling and generation processor, a voice activity detector and a noise level estimator. The echo suppressor is configured to attenuate echo and noise components of a communications signal, and the noise modeling and generation processor is configured to model the noise component of the communications signal and to provide comfort noise for the echo suppression device based on the model. The voice activity detector provides an indication of whether the communications signal includes a voice component, and the noise level estimator computes an estimate of a noise level of the communications signal and provides an indication of whether an energy level of the communications signal is less than the computed estimate. According to the invention, the noise model is updated only when the voice activity detector indicates that there is no voice component in the communications signal and the noise level estimator indicates that the energy level of the communications signal is less than the computed noise level estimate. As a result, it is unlikely that the noise model will be erroneously updated based on portions of the communications signal which include speech.

Still another alternative echo suppression device according to the invention includes an echo suppressor and a comfort noise generator. The echo suppressor is configured to attenuate echo and noise components of a communications signal, and the comfort noise generator is configured to provide comfort noise for the echo suppression device. In the echo suppressor, a portion of the communications signal falling within an attenuation window is multiplied by a scale factor. Accordingly, an output of the comfort noise generator is limited to the attenuation window and scaled based on the scale factor to provide an appropriate limited and scaled comfort noise output which can be added to an audio output of the echo suppressor.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

Figure 1A:
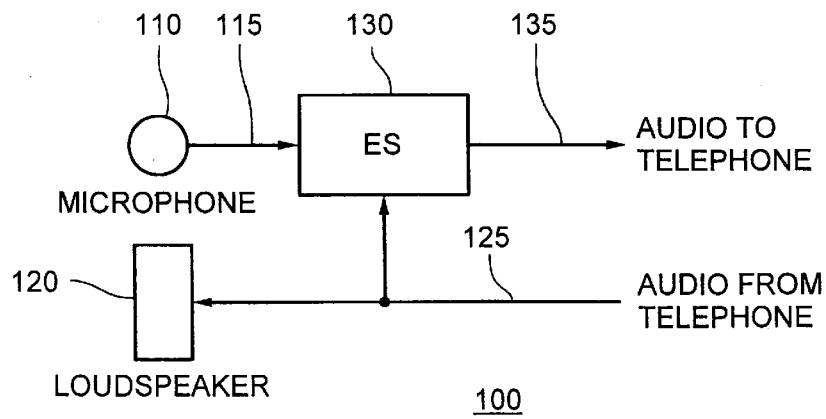
FIG. 1A depicts an exemplary echo suppression system in which the teachings of the present invention can be implemented.
Figure 2A:
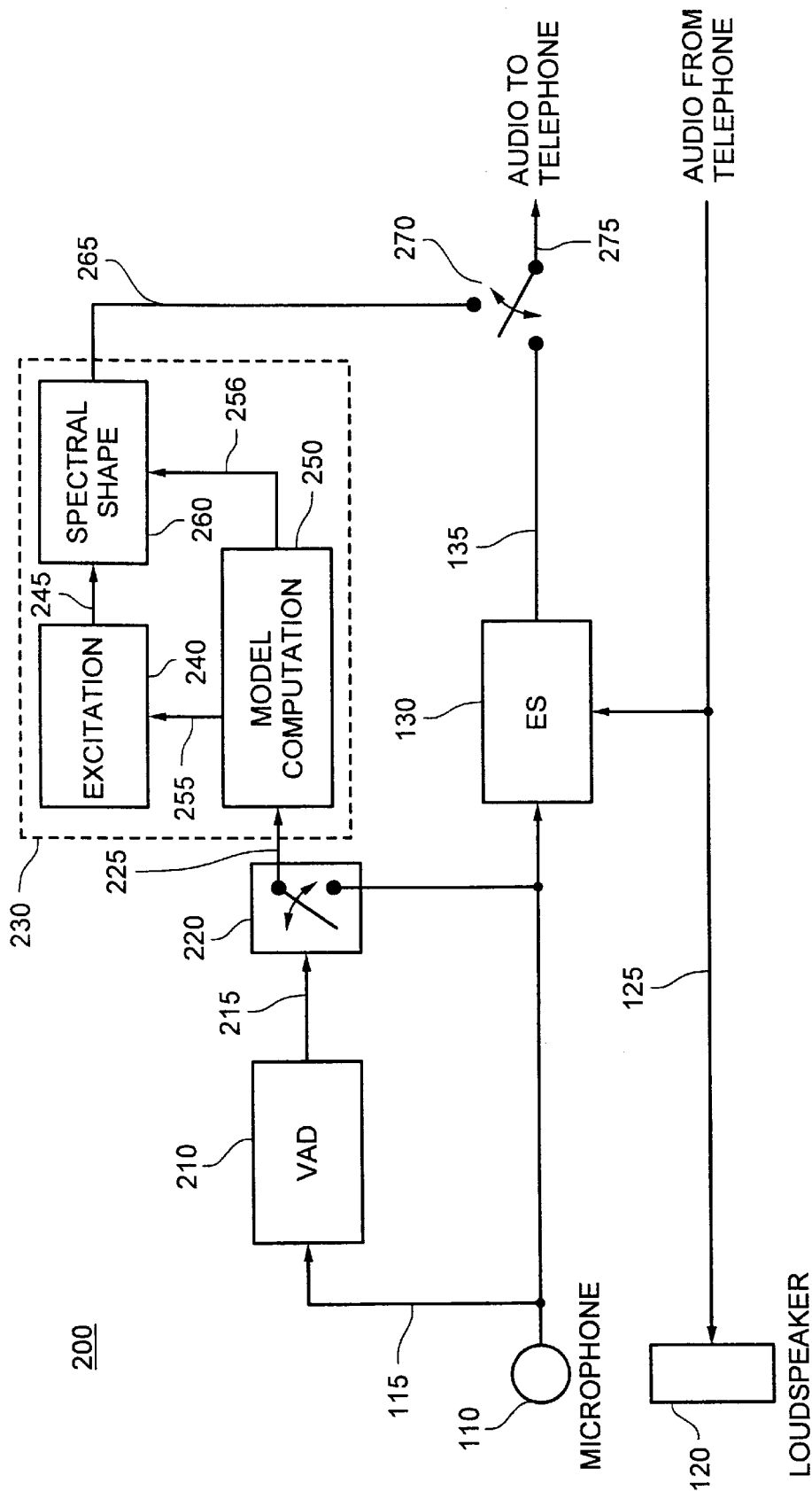
FIG. 2A depicts an exemplary echo suppression system including a noise modeling and generation processor according to the present invention.

FIG. 2A depicts an exemplary echo suppression system 200 in which comfort noise aspects of the present invention are integrated with the echo suppression configuration of FIG. 1A. In addition to the microphone 110, the loudspeaker 120 and the echo suppressor 130, the exemplary echo suppression system 200 includes a voice activity detector 210, a first switch 220, a noise modeling and generation processor 230 (including an excitation block 240, a model computation block 250 and a spectral shaping block 260) and a second switch 270.

The audio output 115 of the microphone 110 is coupled to the audio input of the echo suppressor 130 and to an audio input of the voice activity detector 210. The audio output 115 of the microphone 110 is also coupled to a first pole of the first switch 220. A binary output 215 of the voice activity detector 210 is coupled to a throw input of the first switch 220, and an audio output 225 from a second pole of the first switch 220 is coupled to an audio input of the model computation block 250.

An excitation parameter output 255 of the model computation block 250 is coupled to a control input of the excitation block 240, and an excitation signal 245 output by the excitation block 240 is coupled to an excitation input of the spectral shaping block 260. A shaping parameter output 256 of the model computation block 250 is coupled to a control input of the spectral shaping filter 260, and a modeled noise output 265 of the spectral shaping block 260 is coupled to a first input pole of the second switch 270.

Audio output 135 from the echo suppressor 130 is coupled to a second input pole of the second switch 270, and an output pole of the second switch 270 provides an audio input 275 to the telephone (not shown). The audio output 125 from the telephone is coupled to the audio input of the loudspeaker 120 and to the reference input of the echo suppressor 130.

In operation, the voice activity detector (VAD) 210 outputs a binary flag indicating the presence or absence of speech in the microphone output signal 115 (e.g., 1=voice, 0=no voice). Methods for implementing the voice activity detector 210 are well known. For example, European Telecommunications Standards Institute (ETSI) document GSM-06.82 describes an implementation suitable for purposes of the present invention.

When the voice activity detector 210 indicates that no speech is present (i.e., that only noise is present) in the microphone signal 115, the microphone signal 115 is connected via the first switch 220 to the audio input of the noise modeling and generation processor 230 (more specifically, to the audio input of the model computation block 250), and the noise modeling and generation processor 230 uses the audio signal 115, 225 to compute and/or update a parametric noise model. However, when the voice activity detector 210 indicates that speech is present in the microphone signal 115, the first switch 220 is opened, the noise model parameters are frozen, and the noise modeling and generation processor 230 uses the prevailing parametric noise model to generate samples of the comfort noise 265.

In the configuration of FIG. 2A, the second switch 275 is used to selectively substitute the comfort noise 265 for the suppressor output 135 as the near-end audio signal 275 for the telephone. In other words, when the echo suppressor 130 is active and attenuating the noise component of the microphone signal 115, the comfort noise signal 265 is passed to the far-end user. Otherwise, the audio output 135 from the echo suppressor 130 is passed to the far-end user. In alternative configurations, the second switch 270 is replaced with a summing device, and a scaled version of the comfort noise 265 is added to the echo suppressor output 135 to provide comfort noise which compensates for the noise attenuation provided by the echo suppressor 130. In other words, as the echo suppressor 130 becomes more active and attenuates the background noise to a greater degree, the level of added comfort noise is increased, and vice versa.

Figure 1B:
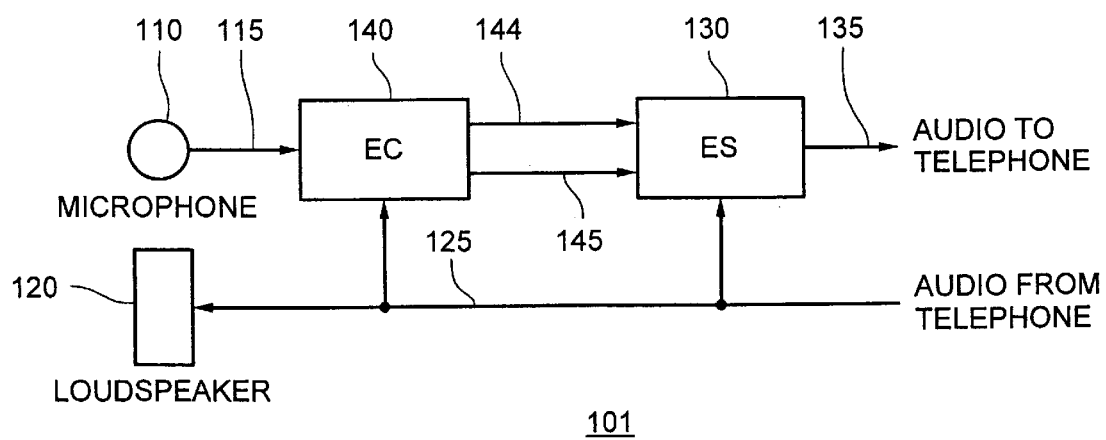
FIG. 1B depicts an alternative echo suppression system in which the teachings of the present invention can be implemented.
Figure 2B:
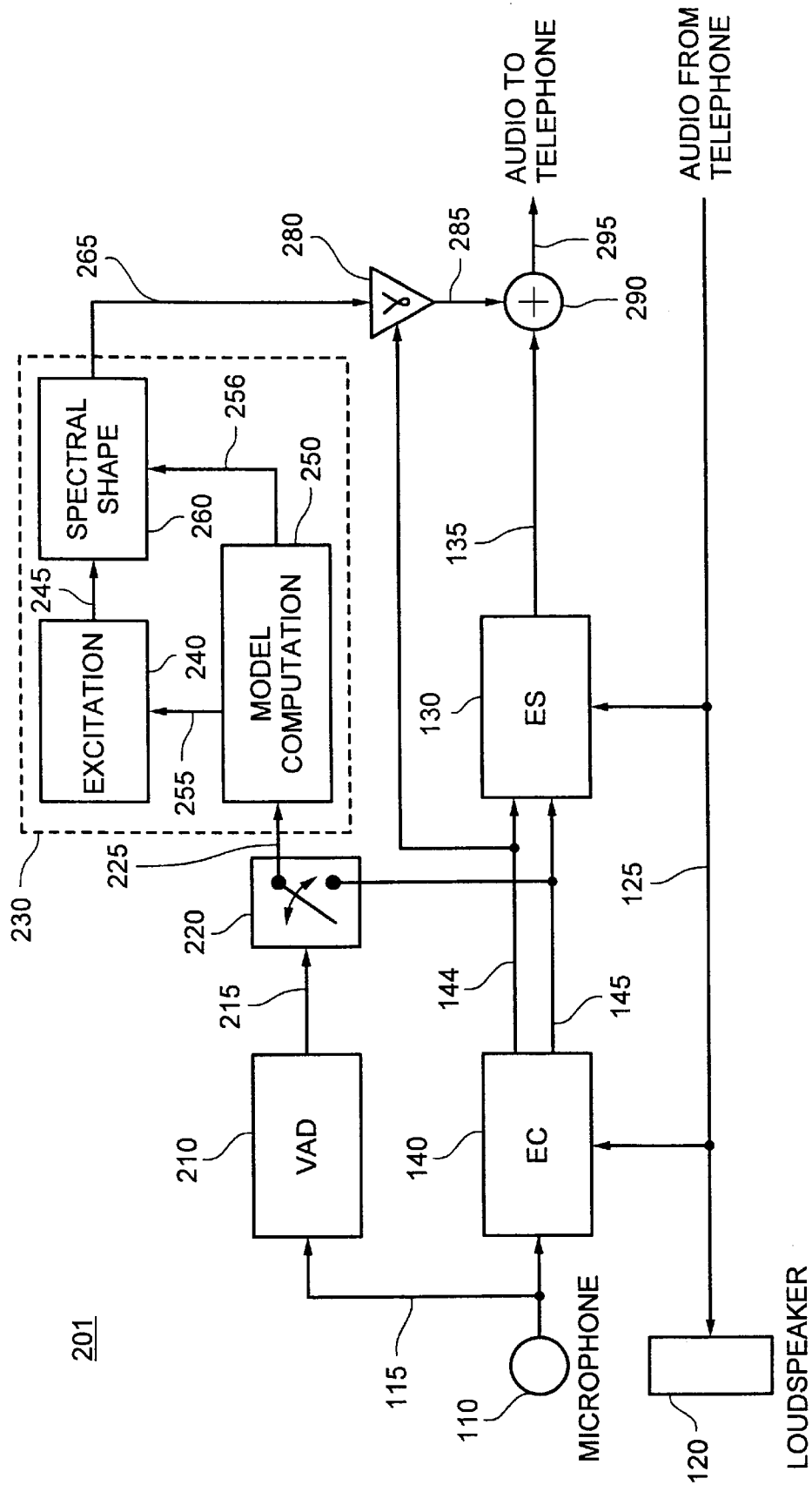
FIG. 2B depicts an alternative echo suppression system including a noise modeling and generation processor according to the present invention.

FIG. 2B depicts an exemplary echo suppression system 201 in which comfort noise aspects of the system 200 of FIG. 2A are combined with the echo suppression configuration of FIG. 1B. As shown, the exemplary system 201 includes the microphone 110, the loudspeaker 120, the echo suppressor 130 and the acoustic echo canceler 140 of FIG. 1B, as well as the voice activity detector 210, the first switch 220 and the noise modeling and generation processor 230 of FIG. 2A. The exemplary system 201 also includes a γ attenuation block 280 and a summing device 290.

The audio output 115 of the microphone 110 is coupled to the audio input of the acoustic echo canceler 140 and to the audio input of the voice activity detector 210. The control output 144 of the acoustic echo canceler 140 is coupled to the control input of the residual echo suppressor 130 and to a control input of the γ attenuation block 280. The audio output 145 of the acoustic echo canceler 140 is coupled to the audio input of the echo suppressor 130 and to the first pole of the first switch 220. The binary output 215 of the voice activity detector 210 is coupled to the throw input of the switch 220, and the audio output 225 from the second pole of the switch 220 is coupled to the audio input of the noise modeling and generation processor 230.

The internal connections of the noise modeling and generation processor 230 are as described above with respect to the embodiment of FIG. 2A. The modeled noise output 265 of the noise modeling and generation processor 230 is coupled to a signal input of the γ attenuation block 280, and an adjusted noise output 285 of the γ attenuation block 280 is coupled to a first additive input of the summing device 290. The audio output 135 of the echo suppressor 130 is coupled to a second additive input of the summing device 290, and an output 295 of the summing device 290 serves as audio input to the telephone (not shown). The audio output 125 from the telephone is coupled to the audio input of the loudspeaker 120 and to the reference inputs of the acoustic echo canceler 140 and the echo suppressor 130.

In operation, the voice activity detector 210 functions generally as described above with respect to FIG. 2A. More specifically, when the voice activity detector 210 indicates that no speech is present in the microphone signal 115, the audio input 145 to the echo suppressor 130 is connected via the first switch 220 to the audio input of the noise modeling and generation processor 230. The noise modeling and generation processor 230 then uses the audio signal 145, 225 to compute and/or update a parametric noise model. However, when the voice activity detector 210 indicates that speech is present in the microphone signal 115, the first switch 220 is opened, the noise model parameters are frozen, and the noise modeling and generation processor 230 uses the prevailing noise model to generate the comfort noise 265.

As shown, the comfort noise samples 265 are scaled and/or clipped, via the γ attenuation block 280, in accordance with the control metric 144 to provide adjusted comfort noise samples 285 having a level which matches that of the noise attenuated by the non-linear echo suppressor 130. The adjusted comfort noise samples 285 are added to the suppressor output 135 via the summing device 290, and the resulting audio signal 295 is passed to the far-end user. Alternatively, the second switch 275 of FIG. 2A can be substituted for the γ attenuation block 280 and the summing device 290 to provide simple switching between the suppressor audio signal 135 and the comfort noise samples 265.

In the exemplary systems 200, 201 of FIGS. 2A and 2B, the parametric noise model provided by the noise modeling and generation processor 230 generally includes two parts. Namely, a spectral shaping filter and an excitation signal. The spectral shaping filter and the excitation signal are implemented via the spectral shaping block 260 and the excitation block 240, respectively, using spectral shaping parameters (e.g., filter coefficients) 255 and at least one excitation parameter 256 provided by the model computation block 250. The excitation and spectral shaping parameters are stored in static memory and are used to generate the comfort noise samples 265 as necessary (i.e., when the non-linear echo suppressor 130 is active).

Advantageously, the model parameters can be updated on either a frame-by-frame or a sample-by-sample basis, depending for example upon the particular type of acoustic echo canceler 140 being implemented. In frame-wise implementations, the noise model parameters are smoothed over multiple update periods, using known techniques, to prevent abrupt, user-perceptible changes from period to period. Such abrupt changes can result, for example, when the noise model parameters are erroneously updated based on audio samples including a voice component (i.e., when the voice activity detector 210 mistakes voice and noise for noise only). Note, however, that the degree of smoothing is balanced in practice with the need to quickly adapt to changes in the character and level of the background noise.

According to a first exemplary embodiment, the comfort noise 265 is modeled as an autoregressive (AR) random process having a spectral shaping filter given by:

$$H(z) = \frac{G}{1 - \sum_{i=1}^{N} a_i z^{-i}},$$

where G is a gain constant and the $a_i$, i=1 to N, are filter coefficients.

In a first embodiment, the N filter coefficients $a_i$ are determined by computing the first N+1 coefficients of the autocorrelation function r of a frame of samples of the audio signal 225 and then using these values to form the matrix relationship R a=r', where R is an N-by-N matrix with the element of the $i^{th}$ row and $j^{th}$ column given by $R_{ij}=r_{|i-j|}$, $a=[a_1, a_2, \ldots, a_N]^T$ is the column vector of unknown filter coefficients $a_i$, and $r'=[r_1, r_2, \ldots, r_N]^T$ is a column vector of the last N autocorrelation coefficients. Those skilled in the art will recognize that there are many methods for deriving the unknown filter coefficients $a_i$ from this matrix relationship. For example, in an exemplary embodiment, the well known Levinson-Durbin algorithm is used to derive the unknown filter coefficients $a_i$ recursively.

Advantageously, the autocorrelation r provides a full set of noise model parameters, describing both the spectral shaping filter and the excitation signal. Specifically, the spectral shaping filter is defined by the N coefficients $a_i$ as shown in the above equation, and the excitation signal is implemented as a zero-mean pseudo-random sequence having a variance proportional to the zero-lag autocorrelation value $R_o$. Multiple values of the autocorrelation function r are smoothed either recursively or non-recursively. The smoothed version of the autocorrelation function r is kept in static memory within the noise modeling and generation processor 230 and is used to compute the filter coefficients $a_i$ whenever comfort noise synthesis is necessary.

The filter coefficients $a_i$ of the autoregressive model are computed, in an alternative embodiment, on a sample-wise basis. Specifically, a well known adaptive algorithm, such as Least Mean Squares (LMS) or Recursive Least Squares (RLS), is used to update or adapt the filter coefficients $a_i$ directly from sample to sample. Thus, the N filter coefficients $a_i$ define the spectral shaping filter as above, and the excitation signal is modeled using an alternative variance $\sigma_e^2$ which is proportional to the power of the residual error signal provided by the adaptive algorithm.

According to another exemplary embodiment, the comfort noise 265 is modeled as an autoregressive-moving-average (ARMA) random process having a spectral shaping filter given by:

$$H(z) = G \frac{1 - \sum_{i=1}^{M} b_i z^{-i}}{1 - \sum_{i=1}^{N} a_i z^{-i}},$$

where G is a gain constant and the $a_i$ (i=1 to N) and the $b_i$ (i=1 to M) are filter coefficients.

Advantageously, the autoregressive moving-average model is flexible enough to closely match complex background noise spectra using a lower order spectral shaping filter as compared to the autoregressive model. However, since conventional methods for dynamically estimating the filter coefficients $b_i$ from the audio signal 225 are relatively complex and potentially unstable, fixed values for the filter coefficients $b_i$ are set based on a priori information relating to general properties of the background noise environment in which the echo suppression system will be operating (e.g., a car noise environment for a vehicle hands-free accessory application). Given the fixed values for the coefficients $b_i$, the audio signal 225 is first filtered as follows:

$$G(z) = \frac{1}{1 - \sum_{i=1}^{M} b_i z^{-i}}.$$

Doing so removes the influence of the moving-average portion of the overall model and allows the remaining autoregressive portion to be modeled using the techniques described above with respect to the first exemplary embodiment. For a frame-based system, the autoregressive moving-average model is defined by the fixed filter coefficients $b_i$ and the autocorrelation function r. In such case, the excitation signal is implemented as a pseudo-random sequence with a variance proportional to the zero-lag autocorrelation value $R_o$. An exemplary sample-based autoregressive moving-average model is described in detail below with reference to FIGS. 3–4.

Advantageously, the parametric modeling techniques of the present invention are not restricted to parameter sets from the time domain. Alternately, a linear orthogonal transformation can be used to convert frames of time-domain audio samples to another domain in which the parameter set can be constructed. Examples of such orthogonal transformations include the Discrete Fourier Transform, Discrete Cosine Transform and Discrete Wavelet Transform, and those of skill in the art will recognize many others. In one exemplary embodiment of the invention, a frequency-domain parametric model is defined by a set of N spectral magnitudes, given by:

$$M=|DFT\{x_n\}|_{\omega(i), i=1 \ldots N},$$

where the $\omega(i)$, i=1 to N, are discrete frequency points, and the vector $x_n$ represents a frame of samples of the audio output signal 225. The "DFT" operation represents the well known Discrete Fourier Transform, and is realized in practice using a low-complexity implementation such as the also well known Fast Fourier Transform (FFT). In this embodiment, the spectral shaping parameters are included in the magnitude vector M, which is evaluated only at positive frequencies due to spectral symmetry about $\omega=0$ for real $x_n$ (such as samples of an audio signal).

The set of discrete frequencies $\omega(i)$ can be all, or just a subset, of the discrete frequencies in the Fast Fourier Transform output. Multi-frame smoothing, if required, is performed directly on the magnitude vector M. The excitation signal is generated by applying pseudo-random phase values to the spectral amplitudes. A uniform pseudo-random noise generator is used to generate phase values in the fixed range $[0, 2\pi)$. Time-domain comfort noise is then generated by passing the magnitude vector M, with the pseudo-random phase values, through an inverse Fast Fourier Transform. Note also that this type of model is extremely useful for frequency-domain echo suppressors. In such case, the magnitude vector M can be taken directly from a frame of frequency-domain samples output by the suppressor.

As noted above, another exemplary embodiment of the present invention utilizes a sample-based autoregressive moving-average comfort noise model. More specifically, the exemplary embodiment utilizes a first-order autoregressive moving-average model having a single fixed zero and a single variable pole. Recent empirical studies have shown that such a first-order autoregressive moving-average model provides sufficient spectrum accuracy for comfort noise with a minimum of modeling complexity. Indeed, the first-order model provides performance equal to that of the tenth-order autoregressive model used in most modern Linear Predictive Coding (LPC) based voice encoders.

According to the embodiment, a single fixed zero is positioned near Z=-1 in the spectral shaping filter to attenuate high frequency audio components. The single variable pole is then used to provide spectrum biasing or tilt as necessary (recall, for example, that the spectrum of automobile background noise is typically biased toward low end frequencies). Thus, the present invention teaches that a relatively simple and easily implemented first order filter can be used to closely match the spectral content of actual background noise. Further, the fixed zero in the spectral shaping filter implies a fixed pole in the adaptive filter which is used to obtain coefficients for the spectral shaping filter during the modeling stage. The single fixed pole in the adaptive filter in turn implies that the adaptive filter is unconditionally stable. Thus, the embodiment is also extremely robust.

Figure 3:
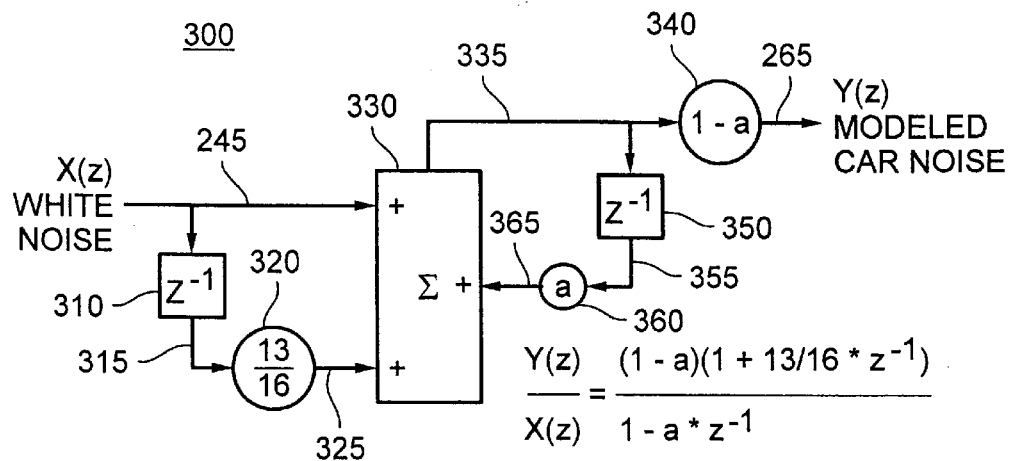
FIG. 3 depicts an exemplary first-order autoregressive moving-average noise generation filter according to the present invention.
Figure 4:
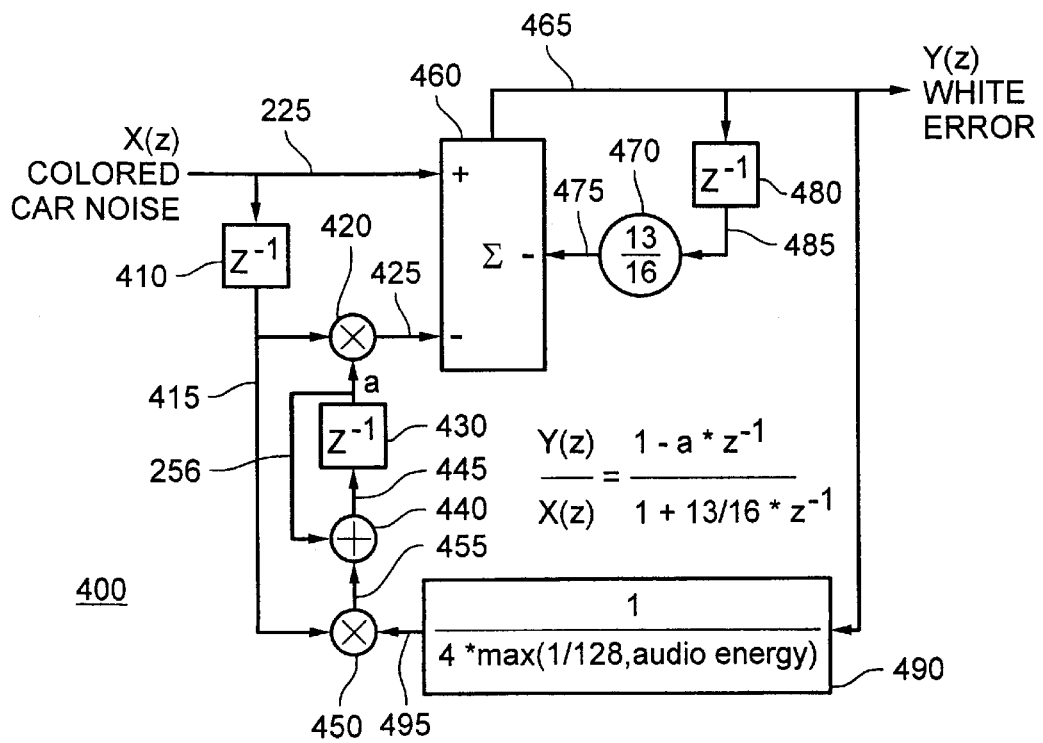
FIG. 4 depicts an exemplary first-order noise model training processor which can be used in conjunction with the exemplary noise generation filter of FIG. 3.

FIGS. 3 and 4 depict, respectively, a first order spectral shaping filter 300 and a complimentary Normalized Least Mean Squares adaptive filter 400 according to the exemplary embodiment. The first order spectral shaping filter 300 corresponds to the spectral shaping block 260 of FIGS. 2A and 2B, and the complimentary adaptive filter 400 corresponds to the model computation block 250 of FIGS. 2A and 2B.

In FIG. 3, the first order spectral shaping filter includes a first delay block 310, a $^{13}/_{16}{}^{ths}$ gain block 320, a summing device 330, a 1-a gain block 340, a second delay block 350 and an a gain block 360. A white noise excitation signal, analogous to the excitation signal 245 of FIGS. 2A and 2B, is coupled to a first additive input of the summing device 330 and to an input of the first delay block 310. An output 315 of the first delay block 310 is coupled to an input of the $^{13}/_{16}{}^{ths}$ gain block 320, and an output 325 of the $^{13}/_{16}{}^{ths}$ gain block 320 is coupled to a second additive input of the summing device 330. An output 335 of the summing device 330 is coupled to an input of the 1-a gain block 340 and to an input of the second delay block 350. An output 355 of the second delay block 350 is coupled to an input of the a gain block 360, and an output 365 of the a gain block 360 is coupled to a third additive input of the summing device 330. An output of the 1-a gain block 340 serves as the modeled background noise, corresponding to the comfort noise 265 of FIGS. 2A and 2B.

In FIG. 4, the complimentary first order adaptive filter 400 includes a first delay block 410, a first multiplier 420, a second delay block 430, a first summing device 440, a second multiplier 450, a second summing device 460, a $^{13}/_{16}{}^{ths}$ gain block 470, a third delay block 480 and a normalizing gain block 490. A colored background noise signal, corresponding to the audio signal 225 of FIGS. 2A and 2B, is coupled to an additive input of the second summing device 460 and to an input of the first delay block 410. An output 415 of the first delay block 410 is coupled to a first input of the first multiplier 420 and to a first input of the second multiplier 450. An output 425 of the first multiplier 420 is coupled to a subtractive input of the second summing device 460, and an output 455 of the second multiplier 450 is coupled to a first input of the first summing device 440.

An output 445 of the first summing device 440 is coupled to an input of the second delay block 430, and an output a of the second delay block 430 is coupled to a second input of the first multiplier 420 and to a second input of the first summing device 440. The output a of the second delay block 430 serves as the filter shaping parameter (i.e., as the single filter coefficient) for the spectral shaping filter 300 of FIG. 3 and corresponds to the filter shaping parameter 256 of FIGS. 2A and 2B.

An output 465 of the second summing device 460 is coupled to an input of the third delay block 480 and to an input of the normalizing gain block 490. An output 485 of the third delay block 480 is coupled to an input of the $^{13}/_{16}{}^{ths}$ gain block 470, and an output 475 of the $^{13}/_{16}{}^{ths}$ gain block 470 is coupled to a second subtractive input of the second summing device 460. An output 495 of the normalizing gain block 490 is coupled to a second input of the second multiplier 450.

In operation, the adaptive filter 400 of FIG. 4 whitens the actual background noise 225 using a Normalized Least Mean Squares algorithm. The resulting filter coefficient a is then used in the inverse spectral shaping filter 300 of FIG. 3 to produce the modeled comfort noise 265 based on a white noise excitation signal 245.

According to the embodiment, the white noise excitation signal 245 is generated by reading single noise samples, from a buffer of actual noise samples, using a random pointer for each single sample. Generating the excitation signal 245 in this way produces white noise samples having a power level equal to that of the actual background noise. Advantageously, the whiteness of the excitation signal 245 is not affected even when the buffer of actual noise samples contains a speech component by mistake. This feature is significant since the voice activity detector 210 can sometimes erroneously indicate no speech (e.g., when the background noise level is changing due to acceleration or deceleration of an automobile in a hands-free application).

As shown in FIGS. 3 and 4, the fixed zero/pole of the noise generation and adaptive filters 300, 400 is set at $Z=-13/16$. Doing so limits the high-frequency boost to 20 dB in the adaptive filter 400 and thus avoids overflow problems in practice. Further, the fixed 20 dB attenuation of high frequencies provided by the noise generation filter 300 is sufficient, when combined with the single variable pole, to provide 40 dB of spectral tilt (which empirical studies have shown to be typical for actual background noise in the context of an automobile hands-free application).

Including the fixed pole in the adaptive filter 400, as opposed to adapting an all-zero filter, improves the model's ability to accurately adapt to match the spectral content of the actual background noise. Additionally, including the 1−a gain multiplier in the spectral shaping filter 300 fixes the DC gain of the filter 300 at $29/16$, which empirical studies have shown to provide good level matching between modeled and actual noise when the decision of the voice activity detector 210 is qualified by that of a noise level estimator (as is described in detail below with reference to FIG. 5). By way of contrast, empirical studies have also shown that including the same power in the input and output signals produces modeled noise which sounds much quieter than the actual noise when the decision of the voice activity detector 210 is qualified via a noise level estimator.

While the level of actual background noise can change rapidly in practice, the spectral shape of actual background noise typically changes more gradually. Thus, the adaptive filter 400 is configured so that the spectrum of the comfort noise 265 changes gradually as well. Specifically, a relatively small update gain constant is chosen for the normalizing block 490 so that adaptation cannot occur too quickly. Empirical studies have shown that a denominator gain multiplier of 4 provides a good compromise between tracking speed and smoothing. By normalizing the update gain with a blockwise measurement of the energy in the audio signal 225 (as shown in FIG. 4), the adaptation rate is made independent of the background noise level.

In addition to minimizing perceived discontinuities in the character of the comfort noise 265, the relatively small update gain of the adaptive filter 400 also provides further immunity against erroneous adaptations based on audio sample blocks containing voice. Note, however, that since the white noise excitation signal 245 is updated as soon as the voice activity detector 210 indicates noise only, changes in the level of the background noise are incorporated almost immediately. As a result, the exemplary embodiment of FIGS. 3 and 4 quickly tracks background noise level while keeping the spectral shape of the comfort noise 265 stable.

Note that using the Least Mean Squares algorithm with an autoregressive model to compute spectral shaping coefficients based on a block of audio samples requires about the same number of DSP cycles as does calculating the autocorrelation coefficients for the block of samples and then using the Levinson algorithm with an autoregressive model to compute the filter coefficients. However, the Levinson algorithm also requires additional DSP cycles to smooth the model over several blocks or frames. Thus, since the smoothing function is inherent in the Least Mean Squares algorithm, the Least Mean Squares method results in a net savings of DSP cycles.

Note also that, given the Least Mean Squares algorithm, going from a tenth-order autoregressive model to a first-order autoregressive model results in a DSP cycle savings of about eighty percent (overhead prevents the complexity from being strictly proportional to the order). However, adding the extra fixed pole for the autoregressive moving-average model, and adding the extra multiply for the Normalized Least Mean Squares algorithm, increases the number of DSP cycles required. Nonetheless, going from a tenth-order autoregressive model with the Least Mean Squares algorithm to a first-order autoregressive moving-average model with the Normalized Least Mean Squares algorithm results in a DSP cycle savings of at least fifty percent.

Figure 5:
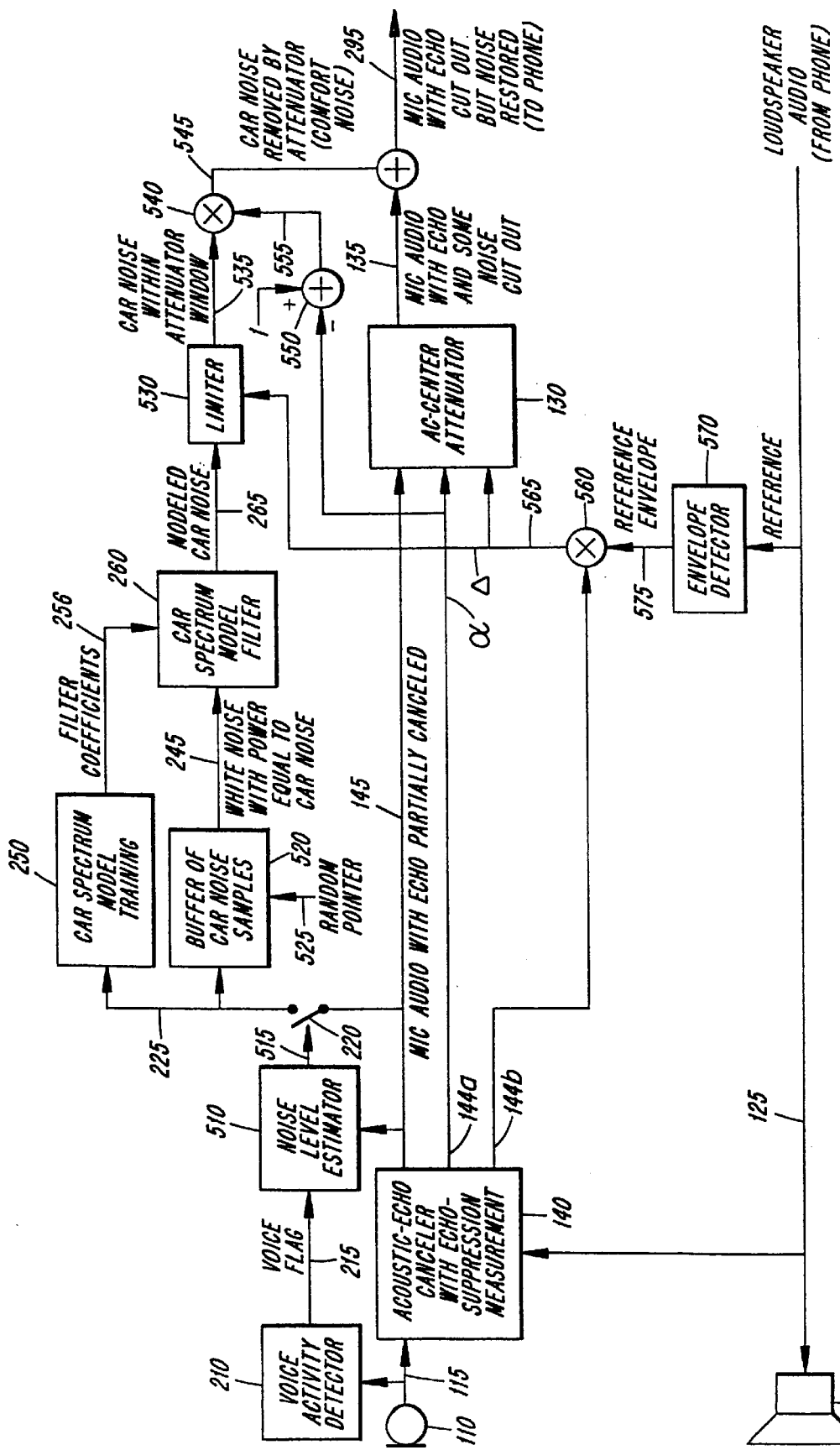
FIG. 5 depicts an exemplary echo suppression system in which a noise modeling and generation processor according to the invention is integrated with an exemplary hybrid residual echo suppressor.

Advantageously, the exemplary embodiment of FIGS. 3 and 4 can be incorporated into any of the echo suppression systems 100, 101, 200, 201 shown in FIGS. 1A, 1B, 2A and 2B. In other words, the exemplary embodiment can be integrated with any type of echo canceler and/or any type of echo suppressor. FIG. 5 depicts an exemplary system 500 in which the exemplary embodiment is integrated with an echo suppression system of the type depicted in FIGS. 1B and 2B.

As shown, the exemplary system 500 includes the microphone 110, the loudspeaker 120, the acoustic echo canceler 140, and the non-linear echo suppressor 130 of FIG. 1B and the voice activity detector 210, the first switch 220, the model computation block 250, the spectral shaping block 260 and the summing device 290 of FIG. 2B. The echo suppression system 500 also includes a noise level estimator 510, a sample buffer 520, a limiter 530, a first multiplier 540, a second summing device 550, a second multiplier 560 and an envelope detector 570.

The audio output 115 of the microphone 110 is coupled to the audio input of the voice activity detector 210 and to the audio input of the acoustic echo canceler 140. The binary output 215 of the voice activity detector 210 is coupled to a control input of the noise level estimator 510, and a binary output 515 of the noise level estimator 510 is coupled to the throw input of the switch 220. The audio output 145 of the acoustic echo canceler 140 is coupled to an audio input of the noise level estimator 510, to the first pole of the switch 220 and to the audio input of the non-linear echo suppressor 130. A first control metric 144*a* of the acoustic echo canceler 140 is coupled to a first control input of the non-linear echo suppressor 130 and to a subtractive input of the second summing device 550. A second control metric 144*b* of the acoustic echo canceler 140 is coupled to a first input of the second multiplier 560, and the output 225 of the second pole of the switch 220 is coupled to the audio input of the model training block 250 and to a queue input of the sample buffer 520.

A random pointer 525 is coupled to a control input of the sample buffer 520, and an output of the sample buffer 520 serves as the excitation input 245 to the spectral shaping filter 260. The filter coefficient output 256 of the model training block 250 provides the control input to the spectral shaping filter 260, and the modeled car noise 265 output by the spectral shaping filter 260 is coupled to a noise input of the limiter 530. A limited noise output 535 of the limiter 530 is coupled to a first input of the first multiplier 540, and a scaled noise output 545 of the first multiplier 540 is coupled to the first input of the first summing device 290. The audio output 135 of the non-linear echo suppressor 130 is coupled to the second input of the first summing device 290, and the output 295 of the first summing device 290 serves as the audio input to the telephone (not shown).

The audio output from the telephone is coupled to reference inputs of the envelope detector 570, the acoustic echo canceler 140 and the loudspeaker 120. An output 575 of the envelope detector 570 is coupled to a second input of the second multiplier 560, and an output 565 of the second multiplier 560 is coupled to a second control input of the non-linear echo suppressor 130 and to a control input of the limiter 530. A constant one (1) is coupled to an additive input of the second summing device 550, and an output 555 of the second summing device 550 is coupled to a second input of the first multiplier 540.

In operation, the residual echo suppressor 130 and the acoustic echo canceler 140 function generally as described above with respect to FIGS. 1B and 2B. By way of example, the residual suppressor 130 of FIG. 5 is shown to be a hybrid suppressor of the type described in the above cited U.S. patent application Ser. No. 09/005,149 (entitled "Methods and Apparatus for Improved Echo Suppression in Communications Systems" and filed on even date herewith). As shown in FIG. 5, the hybrid residual suppressor 130 is referred to as an AC-center attenuator.

Generally, the AC-center attenuator 130 scales a portion of the audio input signal 145 using an appropriate attenuation factor $\alpha$. More specifically, the AC-center attenuator 130 scales that portion of the audio signal 145 falling within an attenuation window defined by a window size $\Delta$. The center of the attenuation window moves with the amplitude of the audio signal 145, and the attenuator 130 provides excellent residual suppression with a minimum of signal distortion.

The acoustic echo canceler 140 of FIG. 5 can be, for example, of the type described in the above cited copending U.S. patent application Ser. No. 08/852,729 (entitled "An Improved Echo Canceler for use in Communications Systems" and filed May 7, 1997). Such an echo canceler can dynamically measure the level of echo cancellation it is providing and thus supply the appropriate control metrics 144a, 144b to the AC-center attenuator 130.

As shown, the first control metric 144a is used directly as the attenuation factor $\alpha$. The second control metric 144b is multiplied by the envelope of the far-end audio signal 125 (via the multiplier 560 and the envelope detector 570), and the resulting control signal 565 is used as the window size $\Delta$. Detailed operation and integration of the echo canceler 140 and the AC-center attenuator 130 is described in the above referenced U.S. patent applications and is omitted here for sake of brevity.

The comfort noise aspects of FIG. 5 are generally as described above with reference to FIGS. 2B, 3 and 4. Generally, the audio signal 145 is passed to the sample buffer 520 during periods of no speech, and the training processor 250 (i.e., the adaptive filter 400) processes the contents of the sample buffer 520 to provide a shaping parameter 256 (i.e., the filter coefficient a) to the noise generation processor 260 (i.e., the spectral shaping filter 300). During periods of speech, the shaping parameter 256 is frozen, and the noise generation processor 260 filters the excitation signal 245 to provide the comfort noise samples 265.

As described above, the excitation signal 245 is generated by randomly selecting samples, via the random pointer 525, from the sample buffer 520. The excitation signal 245 thus consists of white noise samples having power equal to that of the actual background noise. Note that since the sample buffer 520 is not bound by the frame size of the overall system (e.g., 160 samples in many TDMA telephone applications), the configuration of FIG. 5 can be implemented in both sample-based and frame-based communications systems.

Note also that the decision of the voice activity detector 210 in FIG. 5 is qualified by a decision provided by the noise level estimator 510. In other words, the noise model is updated only when a) the voice activity detector 210 indicates that there is no speech and b) the noise level estimator 510 indicates that the energy in the audio signal 145 is less than an estimate of the noise level in the audio signal 145. Qualifying the voice activity detector decision in this way reduces the probability that the noise model will be erroneously adapted based on sample blocks containing voice.

Note, however, that qualifying the voice activity detector 210 in this way also results in modeled comfort noise which tends to have a lower power level than that of the actual background noise. In other words, since the noise level estimator 510 requires that the energy in the audio signal 145 be less than a prevailing noise level estimate before the noise model is trained, the actual noise used to train the noise model is biased toward the low end. This can be remedied, however, by providing an appropriate compensating gain factor in the noise generation processor 260 (i.e., in the spectral shaping filter 300) as is described above with respect to FIGS. 3 and 4.

Those skilled in the art will appreciate that appropriate noise level estimates can be computed using known techniques. Additionally, novel methods for computing noise level estimates are described below by way of exemplary pseudo-code. However, since specific operation of the noise level estimator 510 is not critical to the presently claimed invention, a detailed description is omitted here.

Since the AC-center attenuator 130 does not attenuate that portion of the audio signal 145 falling outside the attenuation window defined by $\Delta$, the modeled noise signal 265 is limited to $\pm\Delta$, via the limiter 530, as shown in FIG. 5. Also, since the audio signal 145 falling within the attenuation window is multiplied by the attenuation factor $\alpha$, the modeled noise within the window (i.e., the limited noise signal 535) is multiplied by $1-\alpha$, via the first multiplier 540 and the second summing device 500. The resulting limited and scaled noise signal 545 is thus of the same character and level as the actual noise removed by the AC-center attenuator 130. As shown, the limited and scaled noise signal 545 is then added to the AC-center attenuator output 135 to provide the near-end audio signal 295 as desired.

For a lower-complexity echo suppression system that does not include an acoustic echo canceler front end (i.e., for a system such as that shown in FIGS. 1A and 2A), the control signals 144a, 144b can be set to constants and the comfort noise features can be implemented in the same way. Also, for systems in which a noise suppressor is inserted between the acoustic echo canceler 140 and the residual echo suppressor 130, the level and character of the comfort noise can be adjusted appropriately by providing the audio output of the noise suppressor, rather than the audio output 145 of the echo canceler, to the noise modeling and generation processor (i.e., to the first pole of the first switch 220 in FIG. 5).

Note that when a pure clipping type residual suppressor is used, the first control signal 144a is not necessary. In such case, the comfort noise level is adjusted using the second control signal 144b and the limiter 530, and the first multiplier 540 and the second summing device 550 are not required. Conversely, when a purely scaling type residual suppressor is used, the second control signal 144b is not necessary. Thus, the comfort noise level is adjusted using the first control signal 144a, the first multiplier 540 and the second summing device 550, and the limiter 530 is not required.

To further illustrate the various features and advantages of the present invention, an echo suppression system similar to that of FIG. 5 is described hereinafter by way of pseudo-code. The pseudo-code is written to simulate the exemplary system as it is implemented using a 32-bit digital signal processor. Those skilled in the art will appreciate that the pseudo-code is exemplary in nature and that the embodiment can be implemented using a wide variety of hardware configurations.

```
% AEC and ANLP simulation script for MATLAB.
% Before running this script, set the following variables:
%      inFile = name of input file, left = far end, right = near end.
%      outFile = name of output file, left = ANLP output, right = AEC output.
% All files use the raw format of the DAT-Link.
% estnoise.m contains the function to estimate noise.
% Glossary:
% EC = Echo Canceler = linear echo suppresser
% AEC = Acoustic-Echo Canceler = loudspeaker-echo canceler
% NLP = Non-Linear Process = residual-echo suppresser = AC-center attenuator
% ANLP = Acoustic Non-Linear Process
% VAD = Voice-Activity Detector
% Maximum positive value for fractional representation.
ONE = 32767/32768;
% Read file containing far-end and near-end signals.
fidIn = fopen(inFile, 'r');
if fidIn == -1
    error(['Error opening file ' inFile])
end
[LRmatrix, wordCount] = fread(fidIn, (2,inf], 'int16');
fclose(fidIn);
% The number of samples in the update integration period.
FRAME_SIZE = 160;
% Larger frame sizes give greater robustness to double-talk & near-end noise
% which tend to integrate towards zero.
% Larger also improves ability to detect convergence because the correlated
% update grows proportionally with frame size whereas the uncorrelated (noise)
% grows with the square-root of the frame size.
% Smaller improves reaction time to changes (echo path, single -> double talk)
% and speeds up convergence.
% Smaller also improves ability to reject vowel sounds.
% 160 is used for ease of porting to a 160-samples-per-frame TDMA phone.
% The resulting 20 ms frame is nearly optimum for dividing speech into
% stationary-signal segments.
NFRAMES = floor( (wordCount/2)/FRAME_SIZE); % Number of frames to process.
clear wordCount
NSAMPLES = NFRAMES * FRAME_SIZE; % Length of sample-based vectors for debug.
%
% Load the mic (uplink) and speaker (downlink) VAD outputs from separate
% files. If each file is not found, run the C executable on the near-end and
% far-end sound files, and save the VAD outputs in a file with the same
% prefix.
%
fidIn = fopen([inFile '_up_vad'],'r');
if fidIn == -1
    disp(['File = ' inFile ' _up_vad not found -- creating . . . '])
    fidOut =fopen('vad_in.raw','w');
    fwrite(fidOut, LRmatrix(2,:), 'int16');    % Uplink audio
    fclose(fidOut);
    !nrsim -s=f vad_in.raw junk vad_out.bit
    !rm vad_in.raw
    !rm junk.flt
    fidIn = fopen( 'vad_out.bit','r');
    if fidIn == -1
         error('Error opening file = vad_out.bit')
    end
    micvad = fread(fidIn, NFRAMES, 'int8');
    !rm vad_out.bit
    fclose(fidIn);
    fidOut = fopen([inFile '_up_vad'],'w');
    fwrite(fidOut, micVad, 'int8');
    fclose(fidOut);
else
    micVad = fread(fidIn, NFRAMES, 'int8');
    fclose(fidIn);
end
fidIn = fopen([inFile '_down_vad'],'r');
if fidIn == -1
    disp(['File = ' inFile '_down_vad not found -- creating . . . '])
    fidOut =fopen( 'vad_in.raw','w');
    fwrite(fidOut, LRmatrix(1,:), 'int16');    % Downlink audio
    fclose(fidOut);
    !nrsim -s=f vad_in.raw junk vad out.bit
    !rm vad_in.raw
```

-continued

```
        !rm junk.flt
        fidIn = fopen('vad_out.bit','r');
        if fidIn == -1
            error('Error opening file = vad_out.bit')
        end
        speakerVad = fread(fidIn, NFRAMES, 'int8');
        !rm vad_out.bit
        fclose(fidIn);
        fidout =fopen([inFile '_down_vad'],'w');
        fwrite(fidOut, speakerVad, 'int8');
        fclose(fidOut);
else
        speakerVad = fread(fidIn, NFRAMES, 'int8');
        fclose(fidIn);
end
% Scale inputs to use range of -1 to ONE.
LRmatrix = LRmatrix / 32768;
% Number of bits to right shift values accumulated over a frame of samples.
FRAME_BITS = ceil(log2(FRAME_SIZE));
% Scale factor to quantize energies to 32 bits (Z8.23 format w/FRAME_SIZE=160)
ENERGY_SCALE = 2 (31-FRAME_BITS);
% Number of taps in the reference delay line.
% It must be long enough that the high-delay taps are mostly uncorrelated with
% the far-end signal and only have near-end energy.
AEC_REF_TAPS = 512;
% Number of taps in the FIR echo-estimation filter.
AEC_COEF_TAPS = 256;
% Number of taps in the high-delay section of the update vector for measuring
% near-end energy.
AEC_NEAR_TAPS = 128;
% Length of vector for capturing car noise samples.
COMFORT_NOISE_SIZE = 128;
% Calculate the threshold on the update vector peak-to-baseline ratio for
% determining the maximum update gain. For noise uniform in the range of
% [-1 1], the expected peak update magnitude is g*FRAME_SIZE/3, while the
% expected RMS of the update vector for the uncorrelated taps is
% g*sqrt(FRAME_SIZE)/3, where g is the echo path gain. Therefore, the maximum
% update vector peak-to-baseline ratio is sqrt(FRAME_SIZE).
% However, voice does not have a constant envelope like noise. Because
% FRAME_SIZE is much smaller than the update vector length, a burst of speech
% will sometimes be in the area of the update vector where the peak is
% measured but not in the area where baseline is measured. Therefore, real
% peak-to-baseline ratios can be extremely high (>300).
% Setting the threshold too low will cause instability due to high-gain
% updates even for low-energy far-end signals under noisy or double-talk
% conditions.
% Setting the threshold too high will cause slow adaptation due to high-gain
% updates only for high-energy far-end signals after large echo-path changes.
% This threshold was empirically determined as a compromise.
AEC_MAX_GAIN_THRESH = 16;
% The peak-to-RMS for noise is independent of the frame size. This threshold
% for rejecting near-end voice/noise and far-end periodic signals (tones and
% vowels) was empirically derived.
AEC_BASELINE_THRESH = 5.5;
% Pre-calculate the constant to use as a multiplier for the status gauge.
AEC_STATUS_GAUGE_SCALER = floor(32768/ . . .
                    (AEC_MAX_GAIN_THRESH-AEC_BASELINE_THRESH)) / 32768;
% Create the gain profile for the FIR coefs. The profile roughly matches the
% expected range of the coefs in the car. This way, updates containing
% periodic components (vowels) are forced to follow the proper exponential
% decay characteristic and minimize divergence. Lower gain on the higher-
% delay taps also reduces update noise contribution to the coefs. The overall
% effect of the profile is to allow higher update gain without instability.
% Since all coefs have 16-bits of dynamic.range, the higher-delay taps also
% have better quantization as a result of the profile. The profile is
% implemented by calculating the FIR 64 taps at a time with a right shift in
% between.
profile=ones(AEC_COEF_TAPS,1);
for k=2:(AEC_COEF_TAPS/64),
        profile( (k*64-63) : (k*64) )=ones(64,1)*2e,cir (1-k);
end
% Allocate debug vectors to speed up execution.
aecUpdateFactor = zeros(1,NFRAMES);
aecChanGainHist = zeros(1,NFRAMES);
aecSpeedHist = zeros(1,NFRAMES);
aecVoiceGainHist = zeros(1,NFRAMES);
aecVoiceGainBaseHist = zeros(1,NFRAMES);
aecNearRatioHist = zeros(1,NFRAMES);
aecNearGainHist = zeros(1,NFRAMES);
```

-continued

```
aecEchoGainHist = zeros(1,NFRAMES);
aecInNoiseHist = zeros(1,NFRAMES);
aecInEchoNoiseHist = zeros(1,NFRAMES);
aecInvoiceHist = zeros(1,NFRAMES);
aecInEchovoiceHist = zeros(1,NFRAMES);
anlpInvoiceHist = zeros(1,NFRAMES);
anlpInNoiseHist = zeros(1,NFRAMES);
anlpDeltaHist = zeros(1,NSAMPLES);
anlGainHist = zeros(1,NFRAMES);
% Initialize variables
aecRef = zeros(1,AEC_REF_TAPS);                         % To use the last values:
aecCoef = zeros(AEC_COEF_TAPS,1);                       % Comment out this
aecInNoise = FRAME_SIZE;                                % Comment out this
aecInEchoNoise = aecInNoise;                            % Comment out this
anlpInNoise = aecInNoise;                               % Comment out this
aecChanGain = ONE;                                      % Comment out this
aecVoiceGain = ONE;                                     % Comment out this
aecVoiceGainBase = aecVoiceGain;                        % Comment out this
aecNearGain = aecVoiceGain;                             % Comment out this
aecEchoGain = aecVoiceGain;                             % Comment out this
anlpComfortNoiseInOld = 0;                              % Comment out this
anlpComfortNoiseOutOld = 0;                             % Comment out this
anlpComfortNoise = zeros(1,COMFORT_NOISE_SIZE);         % Comment out this
anlpArCoef = 0.75;                                      % Comment out this
aecNearRatio = 0;             % Init for history only
aecInNoiseStateVars       = [aecInNoise 0 0];
aecInEchoNoisestateVars   = [aecInEchoNoise 0 0];
anlpInNoiseStatevars      = [anlpInNoise 0 0];
anlpSeed = 1;
anlpArGain = 1 - anlpArCoef;
anlpRefEnvelope = 0;
anlpOutLast = 0;
anlpNearSpeechCount = 0;
anlpNearSpeechFlag = 0;
%disp(['aecCoef(1) = ' dec2hex(aecCoef(1)*32768+(aecCoef(1)<0)*65536)])
%disp(['aecCoef(2) = ' dec2hex(aecCoef(2)*32768+(aecCoef(2)<0)*65536)])
%disp(['aecInNoise = ' dec2hex(aecInNoise*2^31)])
%disp(['anlpInNoise = ' dec2hex(anlpInNoise*2^31)])
%disp(['aecChanGain = ' dec2hex(aecChanGain*32768)])
%disp(['aecVoiceGain = ' dec2hex(aecVoiceGain*32768)])
%disp(['aecVoiceGainBase = ' dec2hex(aecVoiceGainBase*32768)])
%disp(['aecEchoGain = ' dec2hex(aecEchoGain*32768)])
%disp(['anlpComfortNoiseInOld = ' dec2hex(anlpComfortNoiseInOld*32768)])
%disp(['anlpComfortNoiseOutOld = ' dec2hex(anlpComfortNoiseOutOld*32768)])
%disp(['anlpArCoef = ' dec2hex(anlpArCoef*2^31)])
%disp(['anlpArGain = ' dec2hex(anlpArGain*32768)])
fidout = fopen(outFile, 'w');
for frame = 1:NFRAMES,
    frame            % Display the frame number to indicate progress.
    %
    % AEC pre-frame section
    %
    % Since there is a gap between taps of the reference vector which are used
    % to update the FIR coefficients and those used in correlation of near-end
    % energy, the update vector need not be calculated for every tap of the
    % reference vector. Therefore, the update vector is represented by sub-
    % vectors specifically for the two purposes.
    % Clear update sub-vectors which accumulate over a frame.
    aecUpdate = zeros(AEC_COEF_TAPS,1);          % Used for FIR coef update
    aecUpdateNear = zeros(AEC_NEAR_TAPS,1);      % Used for near-end measurement
    % Clear other frame accumulators
    aecEchoEstEnergy = 0;
    % Reset block-floating-point variables.
    aecShiftPending = 0;
    aecErrorShift = 0;
    % Get uplink and downlink PCM audio samples into buffers.
    downlinkAudio      = LRmatrix(1, (frame-1)*FRAME_SIZE+1 : frame*FRAME_SIZE);
    uplinkAudio        = LRmatrix(2, (frame-1)*FRAME_SIZE+1 : frame*FRAME_SIZE);
    % Accumulate AEC near-end-input energy over a frame.
    aecInEnergy = sum(uplinkAudio .^ 2);
    % Quantize energy to 32 bits.
    aecInEnergy = floor(aecInEnergy * ENERGY_SCALE) / ENERGY_SCALE;
    %
    % AEC sample section
    %
    for k = 1:FRAME_SIZE,
        % Shift the far-end (loudspeaker) sample into the reference delay line and
        % calculate FIR output.
        % In the DSP, both operations are in one instruction.
```

-continued

```
        aecRef = [downlinkAudio(k) aecRef(1:AEC_REF_TAPS-1)];
%TEST CODE START
%The following code quickly approximates the commented-out, bit-accurate code.
        aecEchoEst = aecRef(1:AEC_COEF_TAPS) * (aecCoef .* profile);
        aecEchoEst = max(min(round(aecEchoEst * 32768)/32768,ONE),-1);
%TEST CODE END
%       aecEchoEst = 0;
%       for m=(AEC_COEF_TAPS/64):-1:2,
%               aecEchoEst = aecEchoEst + aecRef(m*64-63:m*64) * aecCoef(m*64-63:m*64);
%               aecEchoEst = max(min(aecEchoEst,ONE),-1) / 2;
%               % Quantize for S.31 format
%               aecEchoEst = floor(aecEchoEst * 2^31) / 2^31;
%       end
%       aecEchoEst = aecEchoEst + aecRef(1:64) * aecCoef(1:64);
%       aecEchoEst = max(min(aecEchoEst,ONE),-1);
%       % Quantize for S.15 format
%       % Add 2^(-17) to force the 1's complement floating point to act the same
%       % as 2's complement when rounding a negative number with a fraction of
%       % exactly 0.5.
%       aecEchoEst = round(aecEchoEst * 32768 + 2^(-17))/32768;
%       aecEchoEst = max(min(aecEchoEst,ONE),-1);
    % Accumulate echo-estimate energy over a frame.
    % To improve small-signal performance and to make this measurement in the
    % same way as the other energy accumulations, the full 40-bit accumulator
    % is saved between loop passes.
    aecEchoEstEnergy = aecEchoEstEnergy +aecEchoEst^2;
    % Calculate the AEC output = near-end (microphone) input - echo estimate.
    uplinkAudio(k) = max(min(uplinkAudio(k) - aecEchoEst,ONE),-1);
    % Accumulate coef update = correlation of error (uplinkAudio(k)) and
    % reference. Use block floating point representation, where aecErrorShift
    % is the exponent and aecUpdate/aecUpdateNear( ) is the mantissa.
    T = uplinkAudio(k) * 2^aecErrorShift;
    % Quantize for S.15 format
    T = floor(T * 32768)/32768;
    if aecShiftPending,
            ASM = -1;
            aecErrorShift = aecErrorShift - 1;
            aecShiftPending = 0;
        else
            ASM = 0;
        end
    % Calculate for the region used to update the FIR coefficients.
    aecUpdate    = aecUpdate    + T * aecRef(1:AEC_COEF_TAPS)';
    % Calculate for the region used to measure near-end energy.
    aecUpdateNear = aecUpdateNear + . . .
                T * aecRef(AEC_REF_TAPS-AEC_NEAR_TAPS+1:AEC_REF_TAPS)';
        % Quantize for S.15 format
        % Add 2^(-17) to force the 1's complement floating point to act the same
        % as 2's complement when rounding a negative number with a fraction of
        % exactly 0.5.
    aecUpdate         = round(aecUpdate               * 32768 + 2^(-17))/32768;
    aecUpdateNear     = round(aecUpdateNear           * 32768 + 2^(-17))/32768;
    aecUpdate         = max(min(aecUpdate                      ,ONE),-1;
    aecUpdateNear     = max(min(aecUpdateNear,ONE),-1;
    aecUpdate         = aecUpdate                      * 2^ASM;
    aecUpdateNear     = aecUpdateNear                  * 2^ASM;
        % Quantize for S.15 format after possible right shift.
    aecUpdate         = floor(aecUpdate               * 32768)/32768;
    aecUpdateNear     = floor(aecUpdateNear           * 32768)/32768;
        % Find the peak square of the update vector (assume in first 128 taps).
        % The goal is to get the peak absolute value, but the peak square takes
        % fewer cycles in the DSP, even with the sqrt at the end of the frame.
    aecUpdatePeak2 = max(aecUpdate(1:128).^2);
        % Flag indicates if update needs divided by 2 in the next loop.
    aecShiftPending = aecUpdatePeak2 > 0.25;   % 0.25 = 0.5 2
end
% Quantize energy for 32-bits.
aecEchoEstEnergy = floor(aecEchoEstEnergy * ENERGY_SCALE) / ENERGY_SCALE;
%
% AEC post-frame section
%
aecOut = uplinkAudio;      % Save for output to file for debug.
% Accumulate AEC-output energy over a frame.
aecOutEnergy = sum(uplinkAudio .^2);
% Quantize energy for 32-bits.
aecOutEnergy = floor(aecOutEnergy * ENERGY_SCALE) / ENERGY_SCALE;
% The true reference energy is different for each element of the update
% vector. aecUpdate(1) would use the energy from aecRef(1),
% aecUpdate(2) would use the energy from aecRef(2), and so forth. To
```

-continued

```
% reduce complexity, use a single number to represent the reference energy.
% When the reference energy is used to measure the channel echo gain
% for determining adaptation speed or to normalize the update (NLMS), using
% too small of a value could cause instability. The compromise solution
% implemented here is to use the maximum of the endpoints where profile = 1.
aecRefEnergy = max(sum(aecRef( 1:FRAME_SIZE )   .^2), ...
                   sum(aecRef(64:FRAME_SIZE+63)  .^2));
% Quantize for Z8.7 format
aecRefEnergy = floor(aecRefEnergy*128)/128;
% Measure the update baseline as the RMS of the high-delay elements where
% the correlation between the error and far-end signals is expected to be 0.
% Add 1 LSB to the result to ensure aecUpdateBase is greater and
% aecPeakToBase is smaller after quantization. This avoids the false
% impression of higher echo correlation.
% Adding 1 LSB after a floor operation produces the same result as a ceiling
% operation except for the rare case when all the truncated bits equal zero.
aecUpdateBase = sum(aecUpdateNear.^2)/AEC_NEAR_TAPS;
% Quantize squared intermediate result for Z.31 format
aecUpdateBase = floor(aecUpdateBase*2^31)/2^31;
aecUpdateBase = sqrt(aecUpdateBase);
% Quantize for Z.15 format
aecUpdateBase = floor(aecUpdateBase*32768+1)/32768;
% Find the peak magnitude of the update vector.
aecUpdatePeak = sqrt(aecUpdatePeak2);
% Calculate the update peak-to-baseline ratio.
aecPeakToBase = aecUpdatePeak / aecUpdateBase;
% Quantize for Z11.4 format since 4 fractional bits are sufficient.
aecPeakToBase = floor(aecPeakToBase*16)/16;
% Calculate the status gauge (range=[0,ONE]) from the update peak-to-
% baseline ratio. The gauge, used in down-stream processing, stays the same
% even though the peak-to-baseline ratio changes with frame size and the
% baseline threshold could change.
% For near-end voice/noise or far-end periodic signals (vowels), gauge < 0.1
%    For example, the first frame of a DTMF tone, with frequencies of 941 Hz
%    and 1209 Hz, was found to produce aecPeakToBase=3.5 and, thus,
%    aecStatusGauge=0).
% For double talk, gauge < 0.3.
% For far-end single talk:
%    gauge = ONE when canceler is grossly unconverged, regardless of noise.
%    If the near-end is quiet, gauge=ONE until near complete convergence.
%    As the canceler converges, only residual echo higher in energy than the
%    near-end noise level causes gauge=ONE.
%    Thus, near-end noise causes fewer updates, not reduced update gain.
aecStatusGauge = (aecPeakToBase - AEC_BASELINE_THRESH) * ...
                  AEC_STATUS_GAUGE_SCALER;
aecStatusGauge = max(min(aecStatusGauge,ONE),0);
% Quantize for Z.15 format
aecStatusGauge = floor(aecStatusGauge*32768)/32768
% Estimate the noise frame energy at the AEC input.
[confirmedNoVoiceFlag, aecInNoiseStateVars] = estnoise(aecInEnergy, ...
    (micVad(frame)==0) & (aecStatusGauge==0), aecInNoiseStateVars);
aecInNoise = aecInNoiseStateVars(1);
aecInNoise                            % Display for status
aecInNoiseHist(frame) = aecInNoise;   % Save for debug
% Estimate the echo gain at the AEC input (channel gain).
% Update the estimate only during far-end single talk
% (speakerVad(frame) == 1) & (aecStatusGauge > 0.3), when the ratio is
% accurate despite that the reference measurement includes voice and noise
% while the AEC input measurement includes only voice (aecInVoice >
% aecInNoise*8), and when reference energy is not significantly affected by
% quantization (aecRefEnergy >= 10/128). The instantaneous gain measurement
% is not very accurate because of time misalignment and spectrum variations.
% Therefore, an averaging process is used. The norm of the echo canceler
% filter coefficients is an excellent long-term estimate of the channel
% gain. However, it does not track a changing echo path quickly enough.
% Also, since the channel gain estimate controls the adaptation speed of the
% linear echo canceler, stability is improved if the estimate is independent
% of the linear echo canceler as much as possible. Thus, the following
% scheme is used:
% If the instantaneous measurement (aecChanGainTrial) is less than the
% estimate (aecChanGain), pump the estimate down exponentially.
% To speed adaptation, the estimate is set directly to the instantaneous
% measurement if the error is greater than 50%, and the estimate is pumped
% down proportionally if the error is greater than 12.5%, i.e.,
% (aecChanGain-aecChanGainTrial)/4 > aecChanGain/32 for
% aecChanGain-aecChanGainTrial > aecChanGain/8 = aecChanGain*0.125.
% If the instantaneous measurement is greater than the estimate, pump the
% estimate up exponentially only if the measurement is not clearly dominated
% by near-end voice (aecChanGainTrial < 2). It would not work to use a
```

```
% relative comparison such as (aecChanGainTrial < 2*aecChanGain) because
% no update would occur when the true channel gain jumps quickly.
% Using a pump-up time constant that is ⅛ of the pump-down time constant
% helps tolerate near-end voice in the instantaneous measurement.
% It is difficult to tell the difference between near-end speech and when
% channel echo gain gets worse. The pump-up time constant here
% determines the tracking rate, and it was empirically determined.
aecInVoice = max(0, aecInEnergy-aecInNoise);
aecInVoiceHist(frame) = aecInvoice;
if (speakerVad(frame) == 1) & (aecStatusGauge > 0.3) & . . .
            (aecInvoice > aecInNoise*8) & (aecRefEnergy >= 10/128),
      % Quantize aecInVoice to 4Z8.20 format for use as dividend to get the
      % desired scale for the quotient.
      aecChanGainTrial = floor(aecInVoice *2^20)/2^20 / aecRefEnergy;
      % Quantize and limit quotient to Z2.13 format
      aecChanGainTrial = min(4*ONE, floor(aecChanGainTrial *2^13)/2^13);
      % Calculate the square root of the quotient.
      aecChanGainTrial = sqrt(aecChanGainTrial);
      % Quantize root to Z1.14 format
      aecChanGainTrial = floor(aecChanGainTrial *2^14)/2^14;
      if (aecChanGainTrial < aecChanGain/2),
            aecChanGain = aecChanGainTrial;
      elseif (aecChanGain > aecChanGainTrial),
            aecChanGain = aecChanGain - . . .
                  max ((aecChanGain-aecChanGainTrial)/4, aecChanGain/32);
      elseif (aecChanGainTrial < 2*ONE),
            aecChanGain = min(ONE, aecChanGain + max(aecChanGain/256, 2^(-11)));
      end
      % Quantize for Z.15 format
      aecChanGain = floor(aecChanGain*32768)/32768;
      % Save for debug
      aecChanGainHist(frame) = aecChanGainTrial;
else
      aecChanGainHist(frame) = ONE;
end
aecChanGain                                   % Display for status
aecSpeedHist(frame) = aecChanGain;            % Save for debug
% Determine the update gain.
% Use NLMS to make the adaptation speed constant (independent of far-end
% signal amplitude) as long as the gain is less than or equal to ONE.
% Using the max function results in faster convergence than adding 1 to
% the denominator because the resulting gain is higher.
% Using the maximum of the AEC reference and near-end-input energies limits
% the normalizing gain when there is near-end noise and/or voice. The AEC
% output energy is not used instead of the AEC near-end-input energy because
% higher gain is not desired after convergence, and because stability is
% improved by not using another parameter based on the AEC output to control
% the AEC update gain. aecInEnergy should be less than aecRefEnergy with no
% near-end voice or noise in order to avoid microphone overload (since the
% microphone gain is set according to the loudest near-end speech level).
% The energy multiplier is set to 8 if we are sure there is far-end single
% talk with low hear-end noise (aecInEnergy/16 >= aecOutEnergy). Otherwise,
% it is set to 16. Thus, adaptation is faster when the car is quiet.
% A too-small energy multiplier results in less stability, causing
% overshoots in the adaptation and spikes in the echo canceler output.
% The overshoots also hinder differentiation between far-end single talk,
% with a changing echo path, and near-end speech.
% A too-large multiplier increases echo gain shortly after a perturbation.
% In the numerator, use the gauge to vary the gain according to the
% conditions. Also, use the channel echo gain as a multiplier to
% optimize adaptation speed to the channel. Without this multiplier,
% adaptation is either slower than necessary for high channel
% gain or unstable for low channel gain. Using the norm
% of the adaptive filter coefficients instead of the energy-based channel
% gain results in a more accurate and consistent estimate in the
% long term, but speed and stability would be compromised in the short term
% after an echo path change.
if (aecInEnergy/16 >= aecOutEnergy),
      aecDenom = max(1, 8 * max(aecRefEnergy, aecInEnergy));
      % For debug, set the factor equal to the negative gauge value.
      aecUpdateFactor(frame) = -aecStatusGauge;
else
      aecDenom = max(1, 16 * max(aecRefEnergy, aecInEnergy));
      % For debug, set the factor equal to the gauge value.
      aecUpdateFactor(frame) = aecStatusGauge;
end
% Quantize for Z12.3 format
aecDenom = floor(8 * aecDenom)/8;
aecNumer = aecChanGain * aecStatusGauge;
```

```
% Quantize for 22Z.18 format
aecNumer = floor(aecNumer *2^18)/2^18;
aecUpdateGain = min(aecNumer / aecDenom, ONE);
% Quantize for Z.15 format
aecUpdateGain = floor(aecUpdateGain*32768)/32768;
% Add the update vector to the coefficient vector using the adaptive gain.
% aecCoef is multiplied by profile before use as FIR coefficients.
aecCoef = aecCoef + (aecUpdate * 2^(-aecErrorShift) * aecUpdateGain);
% Quantize for S.15 format
% Add 2^(-17) to force the 1's complement floating point to act the same
% as 2's complement when rounding a negative number with a fraction of
% exactly 0.5.
aecCoef = round(aecCoef * 32768 + 2^(-17))/32768;
aecCoef = max(min(aecCoef,ONE),-1);
% The noise suppresser would go here and process uplinkAudio.
% By using aecUpdate and aecUpdateNear only within one subroutine, they can
% be in temporary memory, available for overlay.
%
% ANLP pre-frame section
%
% Accumulate energy at the ANLP input, which is connected through the noise
% suppresser to the AEC output.
anlpInEnergy = sum(uplinkAudio .^2);
% Quantize energy to 32 bits.
anlpInEnergy = floor(anlpInEnergy * ENERGY_SCALE) / ENERGY_SCALE;
% Estimate the noise frame energy at the ANLP input.
% Use speakerVad since the echo estimate comes from the loudspeaker signal.
[confirmedNoVoiceFlag, anlpInNoiseStateVars] = estnoise (anlpInEnergy, ...
     (micVad(frame)==0) & (aecStatusGauge==0), anlpInNoiseStateVars);
anlpInNoise = anlpInNoiseStateVars(1);
anlpInNoiseHist(frame) = anlpInNoise;      % Save for debug
% Calculate the comfort noise when no voice is confirmed.
if confirmedNoVoiceFlag,
     anlpComfortNoise = uplinkAudio(1:COMFORT_NOISE_SIZE);
     % Use the NLMS algorithm to estimate anlpArCoef in the first-order
     % ARMA noise model of the form:
     %  (1 - anlpArCoef)*(1 + 0.8125*Z^-1)/(1 - anlpArCoef*Z^-1).
     % This ARMA model will be used to filter white noise to get noise that
     % sounds like the car noise.
     % The NLMS algorithm tries to minimize the following expression:
     %   error = uplinkAudio * (1 - anlpArCoef*Z^-1)/(1 + 0.8125*Z^-1).
     % The correlation between error and uplinkAudio*Z^-1 is the update
     % to the coefficient estimate.
     % anlpInEnergy is used to normalize the update gain to provide an
     % adaptation rate independent of level. Calculate the non-zero
     % denominator outside the loop to save MIPS.
     anlpDenom = 4 * max(1/128, floor(anlpInEnergy*128)/128);
     error = 0;
     for i=2:FRAME_SIZE,
          error = -0.8125 * error;
          % Quantize for 5S4.31 format (maximum of 10 * uplinkAudio)
          error = floor(error * 2^31)/2^31;
          error = error + uplinkAudio(i-1:i) * [-anlpArCoef; 1];
          quotient = uplinkAudio(i-1:i-1) * floor(error * 2^12)/2^12 / anlpDenom;
          quotient = max(min(quotient,ONE),-1);
          % Quantize for S.15 format
          quotient = floor(quotient * 32768)/32768;
          anlpArCoef = anlpArCoef + quotient;
          anlpArCoef = max(min(anlpArCoef,ONE),-1);
     end
     anlpArGain = 1 - anlpArCoef;
     % Plot the frequency response of the comfort noise for debug.
%    plot((0:8191)/8192*4000, ...
%         20*log10(abs(freqz(anlpArGain*[1 0.8125],[1 -anlpArCoef],8192))))
%    axis([0 4000 -40 10])
%    pause(1)
end
% Estimate the noise frame energy of the echo at the AEC input.
% Use speakerVad since the echo estimate comes from the loudspeaker signal.
[confirmedNoVoiceFlag, aecInEchoNoiseStateVars] = estnoise( ...
     aecEchoEstEnergy, (speakerVad(frame) ==0) & (aecStatusGauge==0), ...
     aecInEchoNoiseStateVars);
aecInEchoNoise = aecInEchoNoiseStateVars(1);
aecInEchoNoiseHist(frame) = aecInEchoNoise;       % Save for debug
test1Hist(frame) = aecInEchoNoisestateVars(2);    % Save for debug
test2Hist(frame) = aecInEchoNoisestateVars(3);    % Save for debug
aecInEchoNoiseStateVars                           % Display for status
% Estimate the voice energy estimates. Don't let them go below zero.
aecInEchoVoice = max(0, aecEchoEstEnergy - aecInEchoNoise);
```

-continued

```
aecInEchoVoiceHist(frame) = aecInEchoVoice;
aecNearVoice = max(0, aecInVoice - aecInEchoVoice);
anlpInVoice = max(0, anlpInEnergy - anlpInNoise);
anlpInVoiceHist(frame) = anlpInVoice;
% Leak upward the linear-echo-canceler baseline echo-gain estimate.
% It is used for comparison to the instantaneous echo gain to detect
% near-end speech and for the ANLP gains during near-end speech.
% It leaks upward fast enough to track when the instantaneous
% echo gain gets worse. The leakage was empirically determined as a
% compromise between fast tracking to avoid false detection of near-end
% speech during far-end single talk with a changed echo path and minimizing
% distortion of near-end voice/noise during far-end voice/noise.
% When far-end single talk starts after the echo path has changed,
% aecNearGain can go down, go up somewhat, and then go way down. If
% aecNearGain goes up sufficiently above aecVoiceGainBase, near-end speech
% will be detected. If this happens, the leakage on aecVoiceGainBase can be
% increased to prevent this. A leakage constant of 5/4096 was empirically
% found to provide sufficient tracking speed. However, increased leakage
% reduces detection of near-end speech during double talk.
aecVoiceGainBase = min(aecVoiceGainBase + 1/8192, ONE);
% Measure the linear-echo-canceler voice gain, excluding the channel.
% Including the channel gain would make near speech detection unreliable.
% Compute the root of the ratio of voice energy at the output and input of
% the linear echo canceler.
% This raw measurement is not conditional as to whether the voice comes from
% the near end, far end, or both.
% The output of the linear echo canceler is taken at the ANLP input because
% the signal has passed through the noise suppresser, making measurements
% more accurate. Measurement by means of energy includes the loudspeaker
% distortion in the echo, which cross correlation does not. Also, comparing
% energies at the input and output of the echo canceler avoids time-
% alignment issues that arise when comparing the echo-canceler output to the
% reference (due to the delay of the channel).
% Measure gain only when not corrupted by quantization (aecInvoice > 8/2^7),
% when voice is present (aecInVoice > aecInNoise*8),
% and when residual echo is measurable (anlpInVoice > anlpInNoise/2).
% The accuracy of the measurement is not reduced by periodic components
% in the far-end signal.
if (aecInVoice > max(8/2^7, aecInNoise*8)) &
        (anlpInVoice > anlpInNoise/2),
    aecVoiceGain = min(ONE, sqrt(anlpInVoice / (floor(aecInVoice*2^7)/2^7)));
    % Quantize for Z.15 format
    aecVoiceGain = floor(aecVoiceGain*32768)/32768;
    % Measure the ratio of near-end voice to total voice.
    % This produces fewer false indications of near-end voice due to a
    % changing echo path with far-end single talk because it only relies on
    % the energy of the echo estimate, not how well the echo is canceled at
    % the output. However, like aecVoiceGain, false indications of near-end
    % voice are likely when the canceler is grossly untrained.
    % The usual ratio would include a square root since the voice measurements
    % are in energy units. However, greater differentiation is achieved
    % between near-end voice and poor canceler training by using the energy
    % ratio directly. This also saves MIPS.
    aecNearRatio = min(ONE, aecNearVoice / (floor(aecInVoice*2^7)/2^7));
    % Quantize for Z.15 format
    aecNearRatio = floor(aecNearRatio*32768)/32768;
    % Measure the linear-echo-canceler baseline echo-gain estimate during far-
    % end speech. Measure whenever far-end single talk could exist
    % (aecStatusGauge > 0.1) to make sure the parameter tracks the true echo
    % gain (not noise). Otherwise, echo may be heard. Update the
    % baseline echo-gain estimate when the voice gain is lower than the
    % baseline estimate because this indicates a high probability of far-end
    % single talk. By using leakage and not letting the baseline track the
    % voice gain when it is higher than the baseline, the baseline is very
    % robust against noise and near-end speech.
    if (aecStatusGauge > 0.1),
            aecVoiceGainBase = min(aecVoiceGainBase, aecVoiceGain);
    end
    % Measure the linear-echo-canceler voice gain during near-end
    % speech, and reset during far-end single talk (take minimum with voice
    % gain). This will be used for comparison against the voice gain
    % baseline to detect double talk. The only indicators available that
    % near-end speech may be occuring are that the echo canceler gauge is low
    % (aecStatusGauge < 0.3) and that the echo canceler output contains
    % sufficient energy that the voice is likely not just residual echo
    % (anlpInVoice > anlpInNoise*8). Remember that the gauge could be low due
    % to periodic components in the far-end speech. Therefore, extra means
    % are necessary to differentiate between when voice gain gets
    % suddenly worse due to a change in the echo path or loudspeaker
```

-continued

```
% distortion and when there is near-end speech. When voice gain
% gets suddenly worse during far-end single talk, the duration tends to be
% rather short. Therefore, filtering the increases in this parameter
% usually rejects far-end single-talk incidents. The filter time constant
% is a compromise between far-end single-talk rejection and double-talk
% recognition speed, and it was empirically determined.
aecNearGainLast = aecNearGain,
aecNearGain = min(aecNearGain, aecVoiceGain);
if (aecStatusGauge < 0.3) & (anlpInVoice > anlpInNoise*8),
    aecNearGain = aecNearGain + (aecVoiceGain-aecNearGain)/8;
    % Quantize for Z.15 format
    aecNearGain = floor(aecNearGain*32768)/32768;
end
% Use any of three detection methods for near-end speech. Each
% method is more sensitive to near-end speech under certain conditions.
% All detection occurs only when the total voice is sufficiently greater
% than an absolute level or the noise floor to reject conditions where
% only noise is present.
%
% Method 1.
% (aecInEchoVoice < aecInVoice/4) is equivalent to (aecNearRatio >= 0.75)
% but the former is less sensitive to quantization. Spikes on
% aecNearRatio are common for low levels of far-end single talk.
% Therefore, the threshold must be high to avoid false detection. The
% only qualifiers needed for this detection method is that the status
% gauge = 0 and the voice gain baseline be below 0.4625 = 15155/32768.
% The latter threshold is an empirical compromise between avoiding false
% detection when the canceler is grossly untrained and detecting double
% talk as soon as possible after the canceler starts training.
%
% Method 2.
% (aecInVoice > 32/2^7 & anlpInVoice > anlpInNoise*8) rejects low-level
% voice. By doing so, the detection can be more sensitive to lower ratios
% of near-end voice to total voice. Again, accepting conditions only when
% the status gauge = 0 helps reject far-end single talk. The sensitivity
% to near-end speech is optimized by varying the threshold with
% aecVoiceGainBase. The scale factor and off set is an empirical
% compromise between avoiding false detection when the canceler is grossly
% untrained and being as sensitive as possible to near-end speech after
% the canceler starts training.
%
% Method 3.
% Comparing aecNearGain with aecVoiceGainBase detects near-end speech when
% echo suppression gets suddenly and consistently worse. This is because
% aecVoiceGainBase does not react to sudden changes, and aecNearGain uses
% a filter to ensure consistency in the detection. Because of the filter
% used for computing aecNearGain, conditions are more relaxed, which
% allows greater sensitivity to near-end speech. Such conditions include
% having the status gauge < 0.3 rather than = 0, and having no increased
% minimum absolute level for the voice. When far-end single talk starts
% after the echo path has changed, aecNearGain can fall but still stay
% above aecVoiceGainBase for a short time. To avoid audible echo in this
% case, near-end speech is only detected when aecNearGain is greater than
% its last value.
if      ((aecStatusGauge == 0) & (aecInEchoVoice < aecInVoice/4) &
            (aecVoiceGainBase < 15155/32768)) | . . .
            ((aecStatusGauge == 0) & (aecInVoice > 32/2^7) &
            (anlpInVoice > anlpInNoise*8) & . . .
            (aecNearRatio - aecVoiceGainBase*1.5 >= 9830/32768)) | . . .
            ((aecNearGain - aecVoiceGainBase >= 6554/32768) & . . .
            (aecNearGain > aecNearGainLast)),
    % Near-end speech has been detected.
    % If this frame begins a new period of near-end speech (the hang time
    % has expired and the last frame containing voice was only echo),
    % then set the linear-echo-canceler echo gain equal to the baseline
    % echo-gain estimate. This is done only at the beginning of a near-end
    % speech period so that the residual-echo suppresser has consistent
    % attenuation during the near-end speech rather than increasing
    % distortion as the baseline leaks upward while getting no updates.
    if (anlpNearSpeechCount == 0) & (anlpNearSpeechFlag == 0),
        aecEchoGain = aecVoiceGainBase;
    end
    % Set the flag indicating that the last frame with voice contained
    % near-end speech. It will remain set during frames where voice is not
    % detected.
    AnlpNearSpeechFlag = 1;
    % Restart the near-end-speech hang-time counter. When non-zero, it will
    % override anlpNearSpeechFlag to minimize distortion by the residual-
    % echo suppresser of near-end speech during double talk or when the
```

```
            % voice energy is too low to be detected.
            % If this counter were to start only when far-end single talk was
            % detected, there would be less cut-out of near-end speech during double
            % talk. However, the far-end person would hear echo every time he/she
            % started to speak after the near-end person spoke, even after a long
            % pause.
            % When there is a quick transition from near-end speech to far-end
            % single talk (such as when the near-end person talks in the middle of
            % the far-end person's speech), the hang time will cause a short period
            % where the far-end person hears echo (at -25 dB). This artifact is
            % worthwhile because of the significant reduction in cut-out during
            % double-talk gained by the hang time.
            anlpNearSpeechCount = 25;        % 25 * 20 ms = 500 ms hangtime.
      end
end
% If the echo-estimate voice energy is at least 15/16 the near-end voice
% energy, assume that this frame contains far-end echo speech only, and
% clear the near-end speech flag. If the near-end-speech hang-time counter
% has already expired, the residual-echo suppresser will immediately go to
% far-end single-talk mode. Otherwise, the residual-echo suppresser will go
% to far-end single-talk mode when the near-end-speech hang-time counter
% expires. Note that near-end speech could be detected again while the
% counter is in progress, and then the residual-echo suppresser will stay in
% near-end speech mode once the counter expires.
% This detection scheme compares 32-bit numbers and does not use any
% qualifiers based on the energy levels, the status gauge, or measurements
% from previous frames (besides the noise estimates). Therefore, the scheme
% is rather sensitive yet robust. Were this scheme to fail to detect far-
% end speech, the far-end person would hear echo when he/she started to
% speak after the near-end person spoke, even after a long pause.
if (aecInEchoVoice > (aecInvoice - aecInvoice/16)),
      anlpNearSpeechFlag = 0;
end
% If the near-end-speech hang-time counter has expired, and the last frame
% containing voice was only echo, then set the linear-echo-canceler echo
% gain equal to the last-measured linear-echo-canceler voice gain. This
% assumes that no near-end speech is present, so the residual-echo
% suppresser will attempt to suppress all of the voice. This test is after
% that which clears anlpNearSpeechFlag so that aecEchoGain will reflect the
% decision immediately.
if (anlpNearSpeechCount == 0) & (anlpNearSpeechFlag == 0),
      aecEchoGain = aecVoiceGain;
end
aecVoiceGainHist(frame) = aecVoiceGain;              % Save for debug
aecVoiceGainBase                                     % Echo for status
aecVoiceGainBaseHist(frame) = aecVoiceGainBase;      % Save for debug
aecEchoGain                                          % Echo for status
aecEchoGainHist(frame) = aecEchoGain;                % Save for debug
aecNearRatioHist(frame) = aecNearRatio;              % Save for debug
aecNearGainHist(frame) = aecNearGain;                % Save for debug
anlpNearSpeechCount                                  % Echo for status
anlpNearSpeechFlag                                   % Echo for status
% Calculate the loop echo gain up to the ANLP. The ANLP will attenuate as
% needed to meet the total loop echo suppression goal for the system.
% ? is through the volume control.
% aecChanGain is from the loudspeaker to the microphone -- the channel.
% aecEchoGain is from the input to the output of the linear echo canceler.
aecLoopEchoGain = aecChanGain * aecEchoGain;    % Insert volume gain here.
% Quantize for Z.15 format
aecLoopEchoGain = floor(aecLoopEchoGain*32768)/32768
% Set the ANLP window size to capture the expected residual echo, but no
% more. This minimizes distortion on near-end voice and noise. The ANLP
% window size shrinks as the AEC improves its echo gain, so use aecChanGain
% and aecEchoGain to control the window size. The volume-control gain is
% not used because the envelope-detector input for the ANLP comes after the
% volume control. The echo gain estimates measure in an RMS sense, but the
% ANLP needs to suppress the entire residual echo including peaks. Thus,
% use a peak-to-RMS factor multiplier (= 3). The dynamic range of
% anlpWindowGain is two because, when the linear echo canceler is grossly
% untrained, anlpWindowGain needs to be at least two to capture the echo
% within the window.
anlpWindowGain = min(2*ONE, 3 * aecChanGain * aecEchoGain);
% Quantize for Z1.14 format
anlpWindowGain = floor (anlpWindowGain*16384)/16384;
% If the VAD indicates that there only noise on the loudspeaker, then put
% the ANLP in a pass-through mode (gain = ONE). The VAD allows high-quality
% near-end single talk because there is no distortion of the near-end speech
% or noise. The VAD will often say that there is voice when there is only
% noise, so other means are necessary to minimize distortion of the near-end
```

-continued

```
% speech or noise in this case. Also, the VAD will infrequently say that
% there is only noise when there is a low level of voice. The problem is
% somewhat proportional to the noise level on the loudspeaker. However,
% having the linear echo canceler in the loop provides enough echo
% suppression to make the echo inaudible in these cases.
if speakerVad(frame) == 0,         % Near-end single-talk condition.
    anlpEchoGain = ONE;
% Since speakerVad=1, the loudspeaker most likely has speech, but not
% necessarily. If near-end speech is detected, assume double talk. In this
% case, set the total loop echo suppression goal to −25 dB (1843/32768), and
% set the ANLP gain to the needed echo suppression not provided in the rest
% of the loop. The ANLP gain is higher (the suppression is lower) and
% distortion is reduced as the customer turns down the volume from full
% scale. When the linear echo canceler is trained, the ANLP gain is
% typically higher than −10 dB in this mode, so noise masking does not
% improve the sound quality. The far-end user will hear some echo during
% double talk, but this artifact is preferable to cut-out or high distortion
% of the near-end voice.
elseif (anlpNearSpeechCount > 0) | (anlpNearSpeechFlag == 1), % Double-talk
    anlpEchoGain = 1843/32768 / aecLoopEchoGain;
% Since speakerVad=1 and near-end speech is not detected, assume there is
% far-end single talk. The total loop echo suppression goal is −56 dB
% (52/32768) so that echo is almost inaudible when both ends have quiet
% backgrounds. As in double-talk mode, the ANLP gain is set to the needed
% echo suppression not provided in the rest of the loop, and the ANLP gain
% is higher and distortion is reduced as the customer turns down the volume
% from full scale and as the linear echo canceler trains. However, the
% gain needed to attenuate the echo to inaudibility below the noise floor
% may be higher, so the higher of the two gains is used for the ANLP to
% minimize distortion. Without the comfort noise, attenuating both the
% echo and the noise by the same factor would not change the signal-to-noise
% ratio; so noise masking would not work. The comfort noise makes it such
% that the noise at the input and output of the ANLP are the same level.
% Therefore, the ANLP can attenuate the echo to the threshold of audibility
% below the noise floor, without distorting more than necessary. The square
% root is taken of the ratio of noise to voice because these variables are
% in units of energy. Multiplying the desired echo-to-noise ration by the
% actual noise-to-echo ratio will factor out the noise. What is left the
% desired-to-actual echo ratio, which is the gain needed to mask the echo.
else                               % Far-end single-talk condition.
    ECHO_TO_NOISE_GOAL = 1/8;      % −18 dB
    if (anlpInVoice > anlpInNoise),
        anlpEchoGain = max(52/32768 / aecLoopEchoGain, . . .
                       ECHO_TO_NOISE_GOAL * sqrt(anlpInNoise/anlpInVoice));
    else
        % Under noisy conditions, the gain doesn't exceed ECHO_TO_NOISE_GOAL,
        % even though theoretically it could for low-energy voice, because the
        % noise estimate is too large as the noise level falls quickly (car
        % slows down). This causes echo to be heard when the ANLP echo gain is
        % too high.
        anlpEchoGain = max(52/32768 / aecLoopEchoGain, ECHO_TO_NOISE_GOAL);
    end
end
anlpEchoGain = min(ONE, anlpEchoGain);
% Quantize for Z.15 format
anlpEchoGain = floor(anlpEchoGain*32768)/32768
anlpGainHist(frame) = anlpEchoGain;       % Save for debug
% Decrement the near-speech hang counter, if need be, so that it works
% independently of the loudspeaker VAD.
anlpNearSpeechCount = max(0, anlpNearSpeechCount - 1);
%
% ANLP sample section
%
% If the ANLP echo gain is ONE, the ANLP is inactive -- skip to save MIPS.
if (anlpEchoGain == ONE),
    % Keep the envelope detector running.
    for k = 1:FRAME_SIZE,
        anlpRef = aecRef(FRAME_SIZE-k+1);
        anlpRefEnvelope = max(abs(anlpRef), 255/256 * anlpRefEnvelope);
        anlpRefEnvelope = floor(anlpRefEnvelope*2^31)/2^31;
    end
    % Update the variable used by the AC-center attenuator to be the same as
    % what would result from processing the whole frame.
    anlpOutLast = uplinkAudio(FRAME_SIZE);
else
    for k = 1:FRAME_SIZE,
        % ANLP far-end ref = AEC ref. Using aecEchoEst instead or in addition
        % gives no better results because aecEchoEst is rather unrelated to the
        % residual echo. The AEC ref works equally well since
```

-continued

```
% it precedes the earliest echo contained in anlpIn. The long time
% constant in the peak detector is a key to this ANLP, and it makes
% close delay matching of anlpRef to the residual echo unnecessary.
% The offset into the AEC ref delay line can be changed to compensate
% for fixed delays in the echo path due to upsampling, downsampling,
% buffers, and/or minimum channel delay.
anlpRef = aecRef(FRAME_SIZE-k+1);
% Envelope detect (peak detect) anlpRef signal.
% The exponential decay of the peak detector models the decay of the
% reverberation in the car. The time constant is set to handle the most
% slowly-decaying reverberation condition expected.
% A pole less than 255/256 results in echo getting through.
% A pole greater than 255/256 results in excess distortion to near-end.
anlpRefEnvelope = max(abs(anlpRef), 255/256 * anlpRefEnvelope);
% anlpRefEnvelope should be 32 bits for storage.
% anlpRefEnvelope rounded to 16 bits would not decay lower than
% 512/2^15. anlpRefEnvelope truncated to 16 bits would decay 1 bit per
% sample when below 256/2^15, and this is too fast (resulting in echo
% let through).
% Quantize for Z.31 format
anlpRefEnvelope = floor(anlpRefEnvelope*2^31)/2^31;
% ANLP's Delta value is gain controlled by the AEC and limited to ONE.
anlpDelta = min(ONE, . . .
             anlpWindowGain * floor(anlpRefEnvelope*32768)/32768);
% Quantize for Z.15 format
anlpDelta = floor(anlpDelta*32768)/32768;
anlpDeltaHist((frame-1)*FRAME_SIZE+k) = anlpDelta;        % Save for debug
%
% Execute AC-center attenuator.
%
% The ANLP input is connected to AEC output via the noise suppresser.
anlpIn = uplinkAudio(k);
% If the input is below the window,
if (anlpOutLast - anlpIn) >= anlpDelta,
     % Use all of signal outside window and attenuate signal within window.
     anlpOutLast =       anlpIn + anlpDelta - . . .
                         anlpEchoGain * anlpDelta;
% Else if the input is above the window,
elseif (anlpIn - anlpOutLast) >= anlpDelta,
     % Use all of signal outside window and attenuate signal within window.
     anlpOutLast =       anlpIn - anlpDelta + . . .
                         anlpEchoGain * anlpDelta;
% Else the input is inside the window.
else,
     % Attenuate the signal.
     anlpOutLast = anlpEchoGain * (anlpIn - anlpOutLast) + anlpOutLast;
end
% Quantize for S.15 format
anlpOutLast = floor(anlpOutLast*32768)/32768;       % Save for next time.
%
% Add comfort noise such that the ANLP output noise has the same level
% and a similar spectrum as the car noise input to the ANLP.
%
% Use random samples from a frame of captured noise from the car.
% This produces white noise at the same power as the car noise even if
% the captured audio from the car accidently contains voice.
anlpSeed = rem(48271 * anlpSeed, 2147483647);
anlpComfortNoiseIn = anlpComfortNoise(1 + . . .
     rem(anlpSeed,COMFORT_NOISE_SIZE));
% Filter the white noise using the ARMA model discussed above.
% The following is equivalent, assuming anlpArGain = 1 - anlpArCoef.
% anlpComfortNoiseOut = anlpArCoef * anlpComfortNoiseOutOld + . . .
%    anlpArGain * (anlpComfortNoiseIn + 0.8125*anlpComfortNoiseInOld);
ma = anlpComfortNoiseIn + 0.8125*anlpComfortNoiseInOld; % Moving Average
maDiff = anlpComfortNoiseOutOld - ma;
% Quantize for S1.15 format
% Rounding is necessary to avoid a bias on the comfort noise.
% Add 2^(-17) to force the 1's complement floating point to act the same
% as 2's complement when rounding a negative number with a fraction of
% exactly 0.5.
maDiff = round(maDiff * 32768 + 2^(-17))/32768;
anlpComfortNoiseOut = ma + anlpArCoef * maDiff;
% Quantize for S.15 format
% Rounding is necessary to avoid a bias on the comfort noise.
anlpComfortNoiseOut = round(anlpComfortNoiseOut*32768 + 2^(-17))/32768;
anlpComfortNoiseOut = max(-1, min(One, anlpComfortNoiseOut));
% Delay varables for next loop.
anlpComfortNoiseInOld = anlpComfortNoiseIn;
anlpComfortNoiseOutOld = anlpComfortNoiseOut;
```

-continued

```
            % Limit the comfort noise to the window size.
            anlpComfortNoiseOut = min(anlpDelta, . . .
                            max(-anlpDelta, anlpComfortNoiseOut));
            % Scale the comfort noise so that the ANLP output noise equals the ANLP
            % input noise in level.
            anlpComfortNoiseOut = anlpComfortNoiseOut * (ONE - anlpEchoGain);
            % Quantize for S.15 format
            anlpComfortNoiseOut = floor(anlpComfortNoiseOut * 32768 / 32768;
            % Add comfort noise to ANLP output signal.
            uplinkAudio(k) = max(-1, min(ONE, anlpOutLast + anlpComfortNoiseOut));
        end
    end
    % Save to the file outputs collected over a frame in integar format.
    fwrite(fidOut, [uplinkAudio; aecOut]*32768, 'int16');
%disp(['aecInEnergy = ' dec2hex(aecInEnergy * ENERGY_SCALE)])
%disp(['aecErrorShift = ' dec2hex(aecErrorShift+(aecErrorShift<0)*65536)])
%disp(['aecUpdate(1) = ' dec2hex(aecUpdate(1)*32768+(aecUpdate(1)<0)*65536)])
%disp(['aecUpdate(2) = ' dec2hex(aecUpdate(2)*32768+(aecUpdate(2)<0)*65536)])
%disp(['aecUpdateNear(1) = ' . . .
%       dec2hex(aecUpdateNear(1)*32768+(aecUpdateNear(1)<0)*65536)])
%disp(['aecUpdateNear(2) = ' . . .
%       dec2hex(aecUpdateNear(2)*32768+(aecUpdateNear(2)<0)*65536)])
%disp(['aecUpdatePeak2 = ' dec2hex(aecUpdatePeak2*2^31)])
%disp(['aecOutEnergy = ' dec2hex(aecOutEnergy * ENERGY_SCALE)])
%disp(['aecRefEnergy = ' dec2hex(aecRefEnergy *128)])
%disp(['anlpInEnergy = ' dec2hex(anlpInEnergy * ENERGY_SCALE)])
%disp(['aecUpdateBase = ' dec2hex(aecUpdateBase*32768)])
%disp(['aecUpdatePeak = ' dec2hex(aecUpdatePeak*32768)])
%disp(['aecPeakToBase = ' dec2hex(aecPeakToBase*16)])
%disp(['aecStatusGauge = ' dec2hex(aecStatusGauge*32768)])
%disp(['aecInNoise = ' dec2hex(aecInNoise*2^31)])
%disp(['anlpInNoise = ' dec2hex(anlpInNoise*2^31)])
%disp(['anlpComfortNoise(1) = ' . . .
%       dec2hex(anlpComfortNoise(1)*32768+(anlpComfortNoise(1)<0)*65536)])
%disp(['anlpComfortNoise(2) = ' . . .
%       dec2hex(anlpComfortNoise(2)*32768+(anlpComfortNoise(2)<0)*65536)])
%disp(['anlpArCoef = ' dec2hex(anlpArCoef*2^31)])
%disp(['anlpArGain = ' dec2hex(anlpArGain*32768)])
%disp(['aecChanGainTrial = ' dec2hex(aecChanGainTrial*?)])
%disp(['aecChanGain = ' dec2hex(aecChanGain*32768)])
%disp(['aecVoiceGainBase = ' dec2hex(aecVoiceGainBase*32768)])
%disp(['aecVoiceGain = ' dec2hex(aecVoiceGain*32768)])
%disp(['aecEchoGain = ' dec2hex(aecEchoGain*32768)])
%disp(['aecDenom = ' dec2hex(aecDenom*8)])
%disp(['aecNumer = ' dec2hex(aecNumer*2^18)])
%disp(['aecUpdateGain = ' dec2hex(aecUpdateGain*32768)])
%disp(['aecCoef(1) = ' dec2hex(aecCoef(1)*32768+(aecCoef(1)<0)*65536)])
%disp(['aecCoef(2) = ' dec2hex(aecCoef(2)*32768+(aecCoef(2)<0)*65536)])
%disp(['anlpWindowGain = ' dec2hex(anlpWindowGain*16384)])
%disp(['anlpEchoGain = ' dec2hex(anlpEchoGain*32768)])
%disp(['anlpEchoGain = ']); 20*log10(anlpEchoGain)
%disp(['anlpComfortNoiseInOld = ' dec2hex(anlpComfortNoiseInOld*32768)])
%disp(['anlpComfortNoiseOutOld = ' dec2hex(anlpComfortNoiseOutOld*32768)])
%disp(['uplinkAudio(1) = ' . . .
%       dec2hex(uplinkAudio(1)*32768+(uplinkAudio(1)<0)*65536)])
%disp(['uplinkAudio(2) = ' . . .
%       dec2hex(uplinkAudio(2)*32768+(uplinkAudio(2)<0)*65536)])
%pause
%plot([abs(aecUpdate)/aecUpdateBase; . . .
%       zeros(AEC_REF_TAPS - AEC_REF_3TAPS - AEC_NEAR_TAPS, 1); . . .
%       abs(aecUpdateNear)/aecUpdateBase])
%axis([0 AEC_REF_TAPS 0 aecPeakToBase+0.1])
%xlabel('Update_element'),ylabel('Normalized update magnitude'),pause
%plot(20*log10(abs(aecCoef .* profile))),axis([0 AEC_COEF_TAPS -100 1]);
%xlabel('Coefficient number'),ylabel('Magnitude in dB'),pause
end
fclose(fidOut);
clear AEC_MAX_GAIN_THRESH AEC_BASELINE_THRESH AEC_STATUS_GAUGE_SCALER ONE
clear AEC_COEF_TAPS AEC_NEAR_TAPS AEC_REF_TAPS
clear FRAME_SIZE FRAME_BITS ENERGY_SCALE COMFORT_NOISE_SIZE
clear confirmedNoVoiceFlag
clear LRmatrix downlinkAudio uplinkAudio aecRef aecUpdate aecUpdateNear aecOut
clear frame m k i anlpSeed aecEchoEst aecShiftPending aecErrorShift ASM T
clear aecRefEnergy aecInEnergy aecOutEnergy anlpInEnergy aecEchoEstEnergy
clear anlpIn anlpRef anlpRefEnvelope anlpDelta anlpOutLast
clear aecUpdatePeak2 aecUpdatePeak aecUpdateBase aecPeakToBase
clear aecStatusGauge aecDenom aecNumer aecUpdateGain aecLoopEchoGain
clear aecInNoiseStateVars aecInEchoNoiseStateVars anlpInNoiseStateVars
clear aecInVoice anlpInVoice aecInEchoVoice aecNearVoice
```

-continued

```
clear aecNearRatio aecNearGainLast anlpEchoGain
clear aecChanGainTrial anlpComfortNoiseIn anlpComfortNoiseOut
clear aecPeakGain anlpWindowGain anlpDenom anlpArGain error quotient ma
clear fidIn fidOut anlpNearSpeechCount anlpNearSpeechFlag ECHO_TO_NOISE_GOAL
% Estimate the noise frame energy based on the frame energy of a signal.
% A norm-based noise estimate provides a wider dynamic range with 32-bit
% variables, and thus the operation remains consistent even at very low noise
% levels (such as the far end of test_65.raw). However, the norm-based algo
% requires square-root and 32-bit-square operations (more MIPS). This energy-
% based algo has been optimized for quantization of low noise levels, and it
% does an acceptable job -- especially considering that noise level estimation
% is not critical for very low noise levels (voice is always much larger than
% the noise). It also turns out that adaptation speeds can be made the same
% for the norm-based and energy-based algos. All pumping operations here use
% shifts -- just shift one more bit for the norm-based algo.
%
% The goal is to update the estimate quickly when there is no speech in the
% signal and slowly otherwise. Constant adaptation is needed to track the car
% noise as it changes rapidly. The voice-activity detector (VAD) output is a
% good start for determining when to update quickly, but it sometimes
% indicates no voice when there really is a low level of voice which is much
% higher than the noise. noVoiceFlag is the VAD output qualified by the
% status gauge of the linear echo canceler to improve the reliability.
% However, the status gauge does not differentiate noise from near-end speech,
% double-talk, or tones. Therefore, the algorithm must to tolerant of some
% speech during the fast update period. Where the status gauge works well is
% during far-end single talk, which is where it is most important for the
% noise estimate to be accurate to avoid audible echo. The trick used here to
% reduce false deviations (primarily occurring during near-end speech) is to
% pump the estimate up and down at fixed rates based on comparison results
% rather than linearly filter the energy signal. Using a pump-up time
% constant that is 1/4 of the pump-down time constant biases the estimate
% toward the noise floor in spite of some voice. Pumping up and down by fixed
% increments instead of fixed time constants would result in a time constant
% that changes with noise level.
%
% It is difficult to tell the difference between a rising noise floor and
% speech. The pump-up time constants here determines the tracking rate.
% However, the pump-up is necessarily slow to minimize false growth during
% speech. State machines are implemented to allow a faster increase in the
% noise estimate under certain conditions. If the state machine sees the
% signal energy greater than 8 times the noise estimate for at least 900 ms
% during no voice, it is assumed that the noise floor has increased, and the
% noise floor is set equal to the test noise estimate from test period.
% When the input noise is dominated by noise from the far end, blanking due
% to the AMPS in-band control channel or due to poor RF conditions will
% cause the noise floor to temporarily drop. The state machine attempts to
% restore the noise estimate after blanking. First confirm that the energy
% drop is between 5 and 25 frames long. Then confirm that the energy returns
% back to the original level. If the energy remains within a window around
% the original noise level, a relatively short confirmation period is needed.
% If the energy jumps much higher than the original level, then voice could be
% occuring, and a longer confirmation period is needed to ensure that the
% noise floor has not dropped.
%
% Definition of noiseStateVars array:
%       (1) = noise estimate
%       (2) = noise estimate from before blanking or test noise estimate
%       (3) = state variable/counter
%
function [confirmedNoVoiceFlag, noiseStateVars] = . . .
            estnoise(inEnergy, noVoiceFlag, noiseStateVars)
% Define the needed constants in the same way as the parent routine.
% The number of samples in the update integration period.
FRAME_SIZE = 160;
% Number of bits to right shift values accumulated over a frame of samples.
FRAME_BITS = ceil(log2(FRAME_SIZE));
% Scale factor to quantize energies to 32 bits (Z8.23 format w/FRAME_SIZE=160)
ENERGY_SCALE = 2^ (31-FRAME_BITS);
% If the parent rountine has initialized the noise estimate,
if noiseStateVars(1) == FRAME_SIZE,
    %
    % Take actions to speed up adaptation for the beginning of a call.
    %
    % Set the flag so that the comfort noise will initialize with this level.
    confirmedNoVoiceFlag = 1;
    % Start with the noise estimate equal to the energy.
    noiseStateVars(1) = inEnergy;
else
```

-continued

```
%
% Update the noise estimate.
%
% By default, clear the flag so as to indicate no comfort noise training.
confirmedNoVoiceFlag = 0;
%
% The following bias test was performed in Matlab on white noise:
% >>n=160*3000;noise=zeros(1,m);
% >>seed=1;for i=1:n,[noise(i) seed]=noisegen(seed);end
% >>m=3000;for i=1:m,noiseEnergy(i)=sum(noise(160*(i-1)+1:160*i).^2);end
% >>ne=100;for i=1:m,if ne>noiseEnergy(i),
% >>ne=ne-ne/16;else,ne=ne+ne/64;end,neh(i)=ne;end
% >>plot(neh)              % neh is the noise estimate history.
% >>axis([0 20 0 100])     % Notice that neh settles after 10 frames.
% >>1/(sum(neh(11:m))/(m-10)/(sum(noiseEnergy)/m)-1)
% ans = -14.2082
% This indicates that the noise estimate has a bias factor of about -1/14.
% To simplify arithmetic, subtract a factor of 1/16 from the noise estimate
% for comparison purposes to restore the bias.
% In assembly, right shift before subtraction for bit exactness.
noiseBiased = noiseStateVars(1) - noiseStateVars(1)/16;
% Quantize to 32 bits
noiseBiased = ceil (noiseBiased*ENERGY_SCALE)/ENERGY_SCALE;
%
% If the VAD and status gauge indicate no voice,
if noVoiceFlag,
    %
    % Pump the noise estimate quickly.
    %
    % If the noise estimate is too high,
    if noiseBiased > inEnergy,
        %
        % Pump the noise estimate down.
        %
        % To speed up tracking with a decreasing noise floor, it was tried to
        % set the noise estimate equal to the signal energy immediately if the
        % noise estimate was too high by a factor of 8. However, this made the
        % bias very negative when activated, and it created problems with false
        % detections. The time constant is so short that pumping the noise
        % estimate down instead works quite well.
        %
        % To minimize the deviation, don't pump down when the noise estimate
        % equals the signal energy.
        %
        % Quantization causes a minimum change of 1/ENERGY_SCALE, except at 0.
        % In assembly, negate before right shift for bit exactness.
        noiseStateVars(1) = noiseStateVars(1) - noiseStateVars(1)/16;
        % Set the flag for comfort noise training. Requiring that the input
        % energy be lower than the noise estimate improves the probability that
        % comfort noise is not updated during voice.
        confirmedNoVoiceFlag = 1;
    else
        %
        % Pump the noise estimate up.
        %
        % Use a minimum increment to avoid getting stuck near zero.
        % Adding min(noiseStateVars(1)/64, 1/ENERGY_SCALE) is not used instead
        % because it results in slower adaptation to suddenly increased noise.
        noiseStateVars(1) = noiseStateVars(1) + noiseStateVars(1)/64 + . . .
                    1/ENERGY_SCALE;
    end
else
    % Pump the noise estimate slowly.
    % Adaptation is not stopped during voice because of the importance of
    % accurately tracking a decreasing noise floor. Over-estimation of the
    % noise causes under-estimation of the voice energy. This has more of an
    % impact on the NLP input than the linear echo canceler input due to the
    % lower far-end voice energy. Thus, the result is insufficient echo
    % suppression. So it is better to under-estimate than over-estimate the
    % noise.
    %
    % If the noise estimate is too high,
    if noiseBiased > inEnergy,
        %
        % Pump the noise estimate down.
        %
        % Quantization causes a minimum change of 1/ENERGY_SCALE, except at 0.
        % In assembly, negate before right shift for bit exactness.
        noiseStateVars(1) = noiseStateVars(1) - noiseStateVars(1)/64;
```

-continued

```
        else
                %
                % Pump the noise estimate up.
                %
                % At first glance, it may seem that only pumping down during voice is
                % necessary to accurately track a decreasing noise floor. However, this
                % will cause the bias to become too strongly negative. The pump up rate
                % was empirically determined to be the fastest possible while not
                % allowing too much of a false change during voice. This turns out to
                % be very slow since voice can last for several seconds between pauses.
                % Don't use a minimum increment or else the ramp up will be too
                % large for low noise levels during voice.
                noiseStateVars(1) = noiseStateVars(1) + noiseStateVars(1)/1024;
        end
    end
    % Quantize to 32 bits
    noiseStateVars(1) = floor(noiseStateVars(1)*ENERGY_SCALE)/ENERGY_SCALE;
    %
    % State machine for AMPS blanking and noise jump tracking.
    % Don't execute at initialization.
    %
    % If the state machine is in the idle state,
    if noiseStateVars(3) == 0;
            % If the signal energy has significantly dropped below the noise estimate,
            % and if quantization of inEnergy does not give false results,
            if noiseStateVars(1) > max(8*inEnergy, 8/ENERGY_SCALE),
                    % Store the noise estimate for the state machine.
                    noiseStateVars(2) = noiseStateVars(1);
                    % Start the state machine to look for blanking.
                    noiseStateVars(3) = 1;
            % If the VAD and status gauge indicate no voice, and the signal energy is
            % significantly higher than the noise estimate, and if quantization of
            % the noise estimate does not give false results,
            elseif noVoiceFlag & ...
                    (inEnergy > max(8*noiseStateVars(1), 8/ENERGY_SCALE)),
                    % Initialize the test noise estimate.
                    noiseStateVars(2) = inEnergy;
                    % Start the state machine to look for a noise jump.
                    noiseStateVars(3) = -1;
            end
    % Else if the state machine is looking for a noise jump,
    elseif noiseStateVars(3) < 0,
            % If the VAD and status gauge continue to indicate no voice, and if the
            % signal energy remains significantly higher than the noise estimate,
            if noVoiceFlag & (inEnergy > 8*noiseStateVars(1)),
                    % Bias the test noise estimate just like the regular one.
                    % In assembly, right shift before subtraction for bit exactness.
                    noiseBiased = noiseStateVars(2) - noiseStateVars(2)/16;
                    % Quantize to 32 bits
                    noiseBiased = ceil(noiseBiased*ENERGY_SCALE)/ENERGY_SCALE;
                    % If the test noise estimate is too high,
                    if noiseBiased > inEnergy,
                            % Pump the test noise estimate down.
                            % Quantization causes a minimum change of 1/ENERGY SCALE.
                            % In assembly, negate before right shift for bit exactness.
                            noiseStateVars(2) = noiseStateVars(2) - noiseStateVars(2)/16;
                    else
                            % Pump the test noise estimate up.
                            noiseStateVars(2) = noiseStateVars(2) + noiseStateVars(2)/64;
                    end
                    % Quantize to 32 bits
                    noiseStateVars(2) = floor(noiseStateVars(2)*ENERGY_SCALE)/ENERGY_SCALE;
                    % Decrement the state variable which also acts as a counter.
                    noiseStateVars(3) = noiseStateVars(3) - 1;
                    % If the signal energy has remained significantly higher than the noise
                    % estimate for a sufficient period,
                    % (45 frames are needed for the echo of test track s_top10_1.raw)
                    if noiseStateVars(3) == -45,
                            % Jump the noise estimate to the test noise estimate.
                            noiseStateVars(1) = noiseStateVars(2);
                            % Reset the state machine back to the idle state.
                            noiseStateVars(3) = 0;
                    end
            else,
                    % Reset the state machine back to the idle state.
                    noiseStateVars(3) = 0;
            end
    % Else the state machine is looking for blanking.
    else,
```

-continued

```
    % Increment the state variable.
    noiseStateVars(3) = noiseStateVars(3) + 1;
    % States 1-100 count the number of frames in the alleged blanking period.
    if noiseStateVars(3) < 101,
        % If the energy goes back high,
        if 8*inEnergy > noiseStateVars(2),
            % If the blanking is less than 5 frames,
            if noiseStateVars(3)-1 < 5,
                % Either the detection was false or it is not worth restoring the
                % noise estimate. Put the state machine back into idle state.
                noiseStateVars(3) = 0;
            else
                % Voice has occured or the noise has returned after blanking.
                % Set the state variable to 101 to start the next phase.
                noiseStateVars(3) = 101;
            end
        % If the count of low energy frames is too long,
        elseif noiseStateVars(3)-1 == 25,
            % Blanking did not occur -- the noise floor dropped instead.
            % Put the state machine back into idle state.
            noiseStateVars(3) = 0;
        end
    % The state machine has detected the end of the alleged blanking period.
    % Regardless of whether the state machine is counting frames of voice or
    % noise, first check if the energy goes back low.
    elseif 8*inEnergy < noiseStateVars(2),
        % Blanking did not occur -- the noise floor dropped instead.
        % Put the state machine back into idle state.
        noiseStateVars(3) = 0;
    % States 101-200 count the number of frames of voice or noise following
    % the alleged blanking period.
    elseif noiseStateVars(3) < 201,
        % If the energy is goes very high,
        if inEnergy > noiseStateVars(2)*8,
            % Assume that this is voice.
            % Set the state variable to 201 to start the next phase.
            noiseStateVars(3) = 201;
        % If there is a sufficient count of frames where the maximum and minimum
        % energy is close to the saved noise estimate,
        elseif noiseStateVars(3)-101 == 10,
            % The blanking is confirmed.
            % Restore the noise estimate to that before the blanking.
            noiseStateVars(1) = noiseStateVars(2);
            % Put the state machine back into idle state.
            noiseStateVars(3) = 0;
        end
    % States 201-300 count the number of frames of voice following
    % the alleged blanking period.
    %
    % If there is a sufficient count of frames where the minimum
    % energy is close to the saved noise estimate,
    elseif noiseStateVars(3)-201 == 50,
        % The blanking is confirmed.
        % Restore the noise estimate to that before the blanking.
        noiseStateVars(1) = noiseStateVars(2);
        % Put the state machine back into idle state.
        noiseStateVars(3) = 0;
    end
  end
end
```

Those skilled in the art will appreciate that the present invention is not limited to the specific exemplary embodiments which have been described herein for purposes of illustration. For example, the various operational blocks of the disclosed embodiments are conceptual in nature. Actual implementation of the functions of such blocks can be accomplished using a variety of techniques. Furthermore, each exemplary system can be implemented, for example, using multiple standard digital signal processing chips, a single application-specific integrated circuit, or an appropriately configured computer. Note also that, although the exemplary embodiments have been described in the context of acoustic echo canceling, the teachings of the present invention are equally applicable in the context of network echo canceling (e.g., where the near-end user is a landline user and the far-end user is a mobile user). Further, certain aspects of the present invention are applicable to communications systems generally and are not limited to echo suppression systems. Thus, the scope of the invention is defined by the claims which are appended hereto, rather than the foregoing description, and all equivalents which are consistent with the meaning of the claims are intended to be embraced therein.

We claim:

1. An echo suppression device configured to attenuate an echo component of a communications signal, said device comprising:

a noise modeling processor configured to generate at least one noise modeling parameter based upon said communications signal, said at least one noise modeling parameter defining a parametric model of a noise component of said communications signal; and a noise generation processor configured to provide modeled noise samples based upon said at least one noise modeling parameter.

2. The echo suppression device according to claim 1, wherein said echo suppression device attenuates both echo and noise components of said communications signal to provide an output signal, and wherein said modeled noise samples are added to said output signal to replace the attenuated noise component.

3. The echo suppression device according to claim 1, wherein the noise component of said communications signal is modeled as an autoregressive random process.

4. The echo suppression device according to claim 3, wherein said noise modeling processor is configured to generate said at least one noise modeling parameter by computing an autocorrelation vector based upon a frame of samples of said communications signal.

5. The echo suppression device according to claim 4, wherein said noise modeling processor is configured to recursively smooth autocorrelation vectors computed for multiple frames of said communications signal.

6. The echo suppression device according to claim 4, wherein said noise modeling processor is configured to non-recursively smooth autocorrelation vectors computed for multiple frames of said communications signal.

7. The echo suppression device according to claim 4, wherein said noise generation processor is configured to compute a set of filter coefficients based upon said autocorrelation vector, said filter coefficients defining a spectral shaping filter for said autoregressive process.

8. The echo suppression device according to claim 7, wherein said filter coefficients are computed using a Levinson-Durbin algorithm.

9. The echo suppression device according to claim 8, wherein said noise generation processor is configured to generate a zero-mean pseudo-random sequence, said sequence having a variance proportional to a zero-lag coefficient of the autocorrelation vector, and to filter said sequence using said spectral shaping filter to provide said modeled noise samples.

10. The echo suppression device according to claim 3, wherein said noise modeling processor is configured to generate said at least one noise modeling parameter by using a recursive predictive algorithm to compute a set of filter coefficients based on samples of said communications signal, said filter coefficients defining a spectral shaping filter for said autoregressive process.

11. The echo suppression device according to claim 10, wherein said adaptive algorithm is a Least Mean Squares algorithm.

12. The echo suppression device according to claim 10, wherein said adaptive algorithm is a Normalized Least Mean Squares algorithm.

13. The echo suppression device according to claim 10, wherein said noise generation processor is configured to generate a zero-mean pseudo-random sequence, said sequence having a variance proportional to an energy level of a residual error signal of said adaptive algorithm, and to filter said sequence using said spectral shaping filter to provide said modeled noise samples.

14. The echo suppression device according to claim 1, wherein the noise component of said communications signal is modeled as an autoregressive moving-average process.

15. The echo suppression device according to claim 14, wherein a set of zeros in a spectral shaping filter defining said autoregressive moving-average process are fixed based upon a priori information relating to an environment in which said echo suppression device is to be implemented.

16. The echo suppression device according to claim 15, wherein said noise modeling processor is configured to generate said at least one noise modeling parameter by computing an autocorrelation vector based upon a frame of samples of said communications signal.

17. The echo suppression device according to claim 16, wherein said frame of samples is filtered by an intermediate filter before said autocorrelation vector is computed, said intermediate filter including a set of fixed poles corresponding to the set of fixed zeros of said spectral shaping filter.

18. The echo suppression device according to claim 16, wherein said noise modeling processor is configured to recursively average autocorrelation vectors computed for multiple frames of said communications signal.

19. The echo suppression device according to claim 16, wherein said noise modeling processor is configured to non-recursively smooth autocorrelation vectors computed for multiple frames of said communications signal.

20. The echo suppression device according to claim 16, wherein said noise generation processor is configured to compute a set of poles for said spectral shaping filter based upon said autocorrelation vector.

21. The echo suppression device according to claim 20, wherein said poles are computed using a Levinson-Durbin algorithm.

22. The echo suppression device according to claim 20, wherein said noise generation processor is configured to generate a zero-mean pseudo-random sequence, said sequence having a variance proportional to a zero-lag coefficient of the autocorrelation vector, and to filter said sequence using said spectral shaping filter to generate said modeled noise samples.

23. The echo suppression device according to claim 15, wherein said noise modeling processor is configured to generate said at least one noise modeling parameter by using a recursive predictive algorithm to compute a set of poles for said spectral shaping filter based upon samples of said communications signal.

24. The echo suppression device according to claim 23, wherein said adaptive algorithm is a Least Mean Squares algorithm.

25. The echo suppression device according to claim 23, wherein said adaptive algorithm is a Normalized Least Mean Squares algorithm.

26. The echo suppression device according to claim 23, wherein said noise generation processor is configured to generate a zero-mean pseudo-random sequence, said sequence having a variance proportional to an energy level of a residual error signal of said adaptive algorithm, and to filter said sequence using said spectral shaping filter to provide said modeled noise samples.

27. The echo suppression device according to claim 14, wherein said autoregressive moving average process is a first-order process, and wherein a spectral shaping filter defining said first-order process includes a single fixed zero and a single variable pole.

28. The echo suppression device according to claim 27, wherein said single fixed zero is set based upon a priori information relating to an environment in which said echo suppression device is to be implemented.

29. The echo suppression device according to claim 27, wherein said single fixed zero is set to approximately −1.

30. The echo suppression device according to claim 27, wherein said single fixed zero is set to $-13/16$.

31. The echo suppression device according to claim 27, wherein said single variable pole is given by a, and wherein a gain of said spectral shaping filter is proportional to 1−a.

32. The echo suppression device according to claim 27, wherein said noise modeling processor is configured to use an adaptive algorithm to compute said single variable pole based upon samples of said communications signal.

33. The echo suppression device according to claim 32, wherein said adaptive algorithm is a Least Mean Squares algorithm.

34. The echo suppression device according to claim 32, wherein said adaptive algorithm is a Normalized Least Mean Squares algorithm.

35. The echo suppression device according to claim 32, wherein said noise generation processor is configured to generate a zero-mean pseudo-random sequence, said sequence having a variance proportional to an energy level of a residual error signal of said adaptive algorithm, and to filter said sequence using said spectral shaping filter to provide said modeled noise samples.

36. The echo suppression device according to claim 1, wherein said model of the noise component of said communications signal is based upon a linear orthogonal transformation of samples of said communications signal.

37. The echo suppression device according to claim 1, wherein said model of the noise component of said communications signal is a frequency-domain model.

38. The echo suppression device according to claim 37, wherein said noise modeling processor is configured to generate said at least one noise modeling parameter by computing a vector of spectral magnitudes based upon a frame of samples of said communications signal.

39. The echo suppression device according to claim 38, wherein said spectral magnitude vector is derived by computing a Fourier transform of said frame of samples of said communications signal.

40. The echo suppression device according to claim 38, wherein said noise modeling processor is configured to recursively smooth spectral magnitude vectors computed for multiple frames of said communications signal.

41. The echo suppression device according to claim 38, wherein said noise modeling processor is configured to non-recursively smooth spectral magnitude vectors computed for multiple frames of said communications signal.

42. The echo suppression device according to claim 38, wherein said noise generation processor is configured to generate a pseudo-random sequence of phase values and to compute said modeled noise samples based upon said sequence and said spectral magnitude vector.

43. The echo suppression device according to claim 42, wherein said modeled noise samples are derived by computing an inverse Fourier transform of a complex vector, each complex sample in said complex vector including a spectral magnitude from said spectral magnitude vector and a pseudo-random phase from said sequence of pseudo-random phase values.

44. The echo suppression device according to claim 1, wherein said noise generation processor is configured to pseudo-randomly select single samples from a buffer of samples of said communications signal and to filter a sequence of said pseudo-randomly selected single samples, using a spectral shaping filter defined by said at least one noise modeling parameter, to provide said modeled noise samples.

45. An echo suppression device, comprising:
an echo suppressor configured to attenuate echo and noise components of a communications signal;
a sample buffer for storing frames of samples of said communications signal; and
a noise generation processor configured to pseudo-randomly select single samples from said buffer in order to provide a sequence of white noise samples having a power level equal to a power level of said frame of samples.

46. The echo suppression device according to claim 45, wherein said noise generation processor filters said sequence of white noise samples to provide comfort noise which is added to an output of said echo suppressor.

47. An echo suppression device, comprising:
an echo suppressor configured to attenuate echo and noise components of a communications signal;
a noise modeling and generation processor configured to model the noise component of said communications signal and to provide comfort noise for said echo suppression device based on said model;
a voice activity detector configured to provide an indication of whether said communications signal includes a voice component; and
a noise level estimator configured to compute an estimate of a noise level of said communications signal and to provide an indication of whether an energy level of said communications signal is less than said estimate,
wherein said noise modeling and generation processor is configured to update said model only when said voice activity detector indicates that there is no voice component in the communications signal and said noise level estimator indicates that said energy level is less than said estimate.

48. An echo suppression device, comprising:
an echo suppressor configured to attenuate echo and noise components of a communications signal, wherein said echo suppressor removes a portion of said communications signal falling within an amplitude attenuation window; and
a comfort noise generator configured to provide comfort noise for said echo suppression device, wherein an output of said comfort noise generator is limited to said amplitude attenuation window to provide a limited comfort noise output which is added to an audio output of said echo suppressor.

49. An echo suppression device, comprising:
an echo suppressor configured to attenuate echo and noise components of a communications signal, wherein said echo suppressor multiplies a portion of said communications signal falling within an amplitude attenuation window by a scale factor; and
a comfort noise generator configured to provide comfort noise for said echo suppression device, wherein an output of said comfort noise generator is limited to said amplitude attenuation window to provide a limited comfort noise output, and wherein said limited comfort noise output is scaled based on said scale factor to provide a limited and scaled comfort noise output which is added to an audio output of said echo suppressor.

50. The echo suppression device according to claim 45, wherein the single samples are selected in such a manner that prevents sequential replication of substantial portions of the sample buffer.

* * * * *